US011255321B1

(12) United States Patent
Harris et al.

(10) Patent No.: US 11,255,321 B1
(45) Date of Patent: Feb. 22, 2022

(54) UAV PROPULSION SYSTEM WITH DUAL ROTARY VALVES AND MULTI-COMPARTMENT CRANKCASE

(71) Applicant: Northwest ULD, Inc., McMinnville, OR (US)

(72) Inventors: Christopher B. Harris, Amity, OR (US); Dean W. Glass, Carlton, OR (US); Gregory J. Stadeli, McMinnville, OR (US)

(73) Assignee: Northwest ULD, Inc., McMinnville, OR (US)

( * ) Notice: Subject to any disclaimer, the term of this patent is extended or adjusted under 35 U.S.C. 154(b) by 125 days.

(21) Appl. No.: 16/861,437

(22) Filed: Apr. 29, 2020

Related U.S. Application Data

(60) Provisional application No. 62/841,015, filed on Apr. 30, 2019.

(51) Int. Cl.
*F02B 75/18* (2006.01)
*F04B 39/12* (2006.01)
(Continued)

(52) U.S. Cl.
CPC ............ *F04B 39/128* (2013.01); *B64C 27/26* (2013.01); *B64C 39/024* (2013.01); *F02B 75/18* (2013.01);
(Continued)

(58) Field of Classification Search
CPC ........ F02B 75/24; F02B 75/282; F02B 61/04; F02B 25/08; F02B 2700/03; F02B 31/08;
(Continued)

(56) References Cited

U.S. PATENT DOCUMENTS 3,771,503 A * 11/1973 Pirault .................... F02F 11/00
                                                          123/54.4
5,257,601 A * 11/1993 Coffin ....................... F01L 7/06
                                                        123/190.14
(Continued)

OTHER PUBLICATIONS

Bridgestone, "Owner's Handbook & Service Manual, 50 Sport, 60 Sport, 90, 90 Trail, 90 Mountain, 90 Sport, 175 Dual Twin." Clymer Publications, from Fourth Printing Jun. 1974.
(Continued)

*Primary Examiner* — George C Jin
*Assistant Examiner* — Teuta B Holbrook
(74) *Attorney, Agent, or Firm* — Snell & Wilmer L.L.P.

(57) ABSTRACT

A UAV propulsion system is disclosed that utilizes a crankcase having a first crankcase compartment and a second crankcase compartment. Each crankcase compartment includes a corresponding cylinder assembly and piston, with each piston being interconnected with a rotatable crankshaft. A first airflow path extends from an exterior of the UAV propulsion system to the first crankcase compartment, and a separate second airflow path extends from the exterior of the UAV propulsion system to the second crankcase compartment. A first rotary valve may be mounted on and rotate with the crankshaft to control the airflow along the first airflow path to the first crankcase compartment, while a second rotary valve may be mounted on and rotate with the crankshaft to control the airflow along the second airflow path to the second crankcase compartment.

24 Claims, 24 Drawing Sheets

(51) Int. Cl.
*B64C 39/02* (2006.01)
*B64C 27/26* (2006.01)

(52) U.S. Cl.
CPC . *B64C 2201/044* (2013.01); *F02B 2075/1808* (2013.01)

(58) Field of Classification Search
CPC ... F02B 75/18; F02B 2075/025; F02F 7/0009; F01B 7/02
USPC .............................. 123/53.3, 53.5, 53.6, 55.2
See application file for complete search history.

(56) References Cited

U.S. PATENT DOCUMENTS

| | | | | |
|---|---|---|---|---|
| 5,265,566 | A * | 11/1993 | Arnold | F02F 11/007 123/197.4 |
| 6,101,991 | A | 8/2000 | Glover | |
| 6,209,495 | B1 * | 4/2001 | Warren | F01B 9/026 123/197.4 |
| 9,677,434 | B2 | 6/2017 | Pattakos et al. | |
| 2003/0075144 | A1 * | 4/2003 | Hallam | F01L 7/14 123/317 |
| 2007/0068467 | A1 * | 3/2007 | Stone | F02B 57/08 123/45 R |
| 2007/0266983 | A1 | 11/2007 | Thomas et al. | |
| 2009/0050103 | A1 * | 2/2009 | Heaton | B64D 27/24 123/288 |
| 2011/0146601 | A1 * | 6/2011 | Fisher | F01B 9/06 123/62 |
| 2012/0298083 | A1 * | 11/2012 | Howell | F02B 25/26 123/65 R |
| 2016/0102605 | A1 * | 4/2016 | Weinzierl | F02D 41/0087 60/612 |

OTHER PUBLICATIONS

Cycle Magazine, "BRIDGESTONE 175cc "Dual Twin", Cycle Road Test #148" (1966).
Westbury, Edgar T. "Model [Two-Stroke] Petrol Engines." Model Engineer, vol. 134, No. 3344, of May 3, 1968.

* cited by examiner

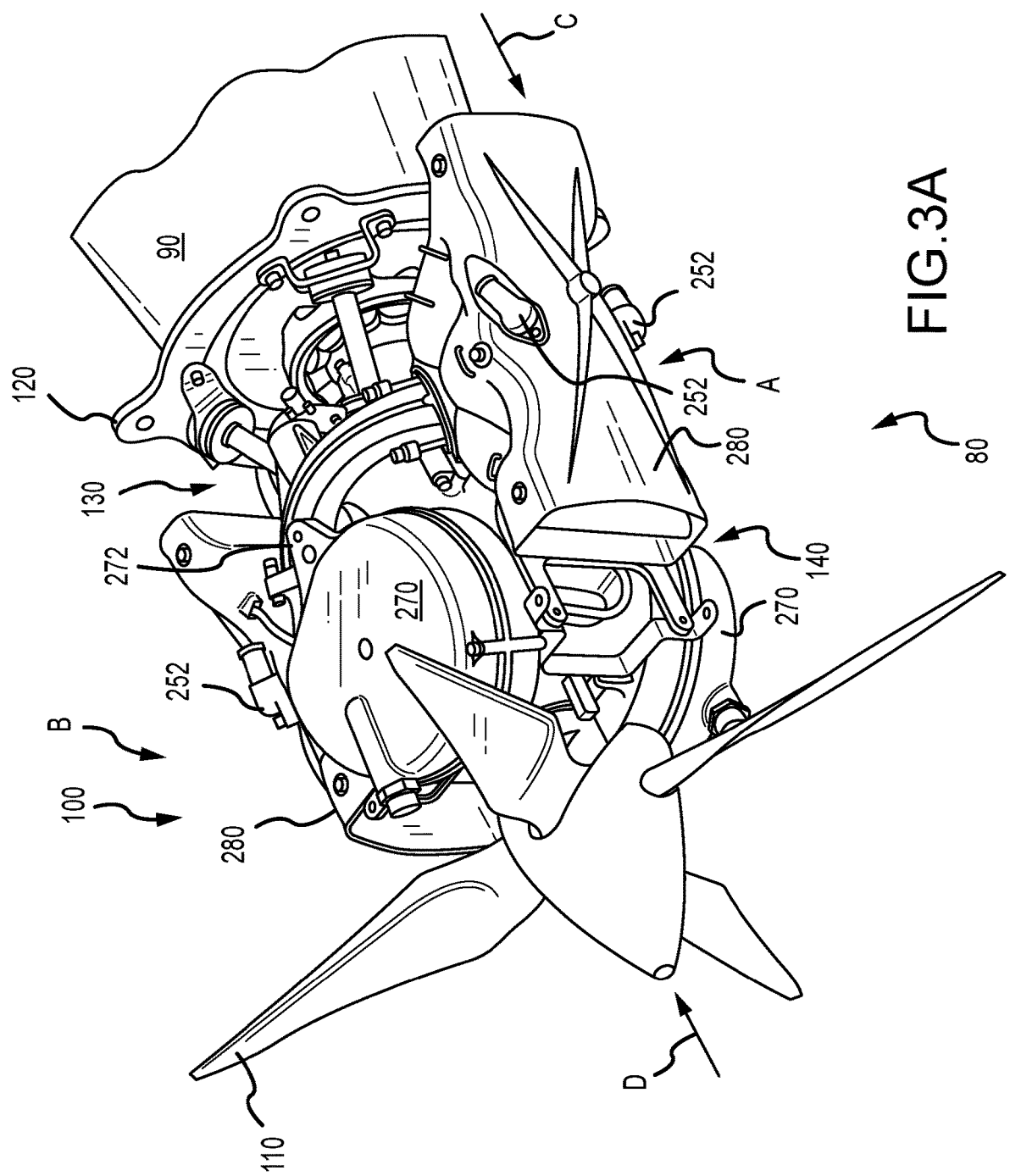

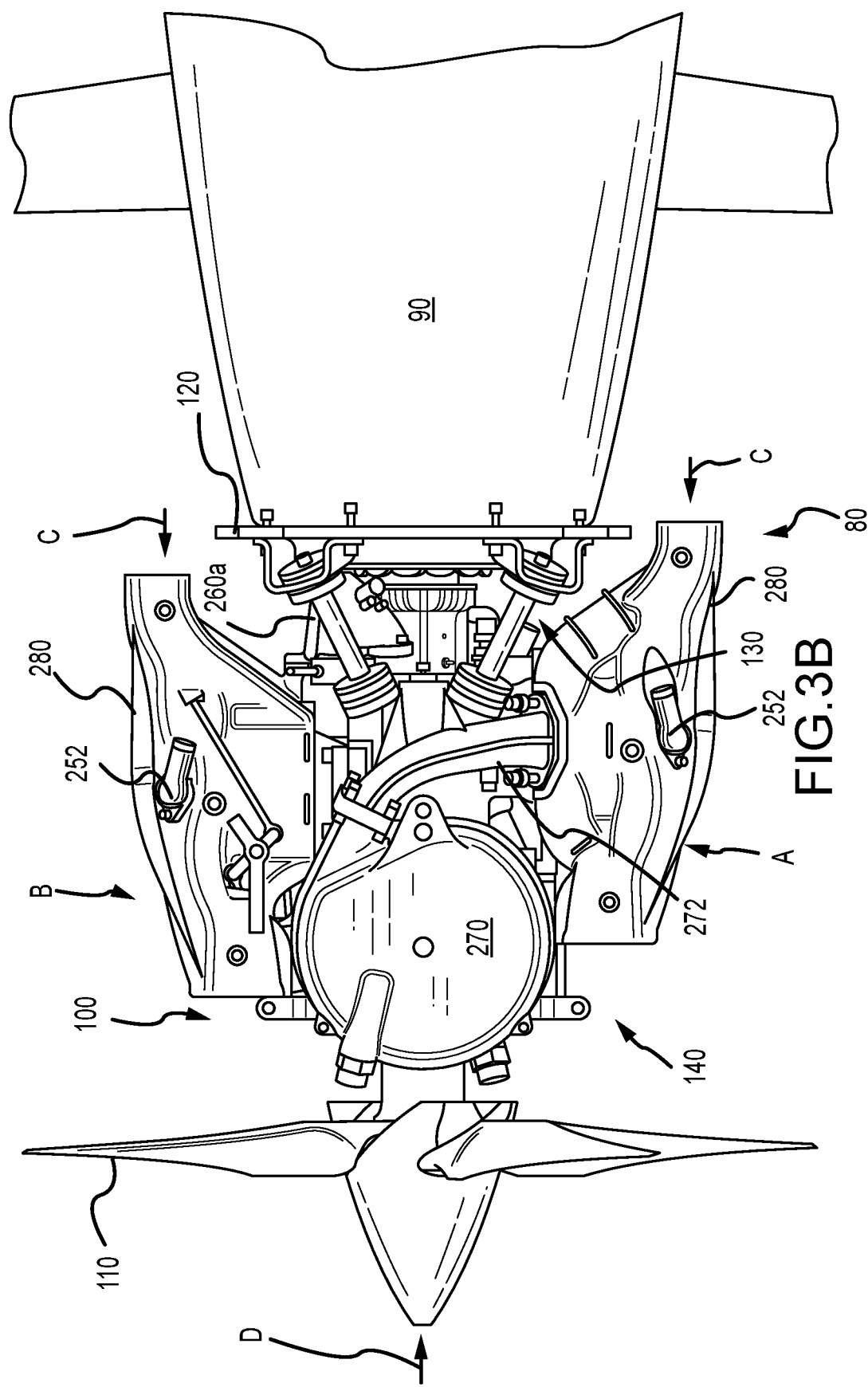

UAV PROPULSION SYSTEM WITH DUAL ROTARY VALVES AND MULTI-COMPARTMENT CRANKCASE

CROSS-REFERENCE TO RELATED APPLICATIONS

This patent application is a non-provisional patent application of, and claims the benefit of U.S. Provisional Patent Application Ser. No. 62/841,015, that is entitled "UAV PROPULSION SYSTEM WITH DUAL ROTARY VALVES AND MULTI-COMPARTMENT CRANKCASE," that was filed on 30 Apr. 2019, and the entire disclosure of which is hereby incorporated by reference.

FIELD

The present invention generally relates to the field of propulsion systems for unmanned aerial vehicles and, more particularly, to the manner in which an air/fuel mixture is directed into the combustion chambers of a multi-cylinder engine.

BACKGROUND

Unmanned aerial vehicles (UAVs) are gaining popularity in several industries, including film making, wildlife surveys, surveillance, and disaster management, and are used in both civilian and military applications. As the demand for UAVs has increased, so has the need for UAV-compatible propulsion systems. Due to compact packaging and favorable weight-to-power ratios, widely available hobby-grade engines are often used for power generation in UAV applications. Other examples of power generation used in UAV propulsion systems include small internal combustion engines, such as those used in motor cycles or small equipment, electric motors, and fuel cells.

Traditional, small internal combustion engines are often constructed of relatively heavy materials intended for ground travel only. Additionally, the differential air pressure at altitude varies greatly from the pressure conditions on the ground, which can cause problems such as degraded performance and evacuation of engine oil. Further, these small internal combustion engines are often designed to deliver short bursts of high power output followed by extended periods of lower power output. The performance demands of a UAV differ greatly, in that an extended high power output is needed for takeoff and climb out, and then prolonged operation at 75-100% of maximum power output for the duration of flight. Asserting these demands on an engine not specifically designed for those operation conditions would degrade both reliability and performance.

The use of electric motors in UAVs rely on the use of batteries. While this is suitable for short range, low weight UAVs, battery size and weight would become prohibitive when scaled up to power larger airframes for longer flight times. In other examples, increasing the current demand on undersized batteries can increase battery temperature and decrease battery life. As a result, unchecked elevated temperatures in batteries, particularly Lithium-ion batteries may have an increased probability of premature degradation. Fuel cells attempt to solve some of the deficiencies of other types of power generation but remain costly and are not widely adopted in industry.

Internal combustion engines supplied by the hobby industry are often compact enough to fit within the packaging constraints of UAVs but are not designed to meet the reliability requirements of the UAV industry. In many instances, hobby grade engines include carburetors and are designed to operate with a gasoline fuel source only. There are issues with this, however, wherein military applications of UAVs are often stationed in remote areas where uncontaminated sources of consistent grade gasoline may be difficult to obtain.

SUMMARY

A UAV propulsion system is presented herein. Both the configuration of such a UAV propulsion system and the operational characteristics of such a UAV propulsion system are within the scope of this Summary. The UAV propulsion system includes a crankcase, which in turn includes a first crankcase compartment and a second crankcase compartment. A first piston is interconnected with a crankshaft, is disposed within a first cylinder assembly, and is reciprocable relative to/within the first cylinder assembly to at least assist in rotating the crankshaft. Similarly, a second piston is interconnected with the crankshaft, is disposed within a second cylinder assembly, and is reciprocable relative to/within the second cylinder assembly to at least assist in rotating the crankshaft.

The first crankcase compartment is fluidly connectable with a first chamber that is collectively defined at least in part by the first cylinder assembly and the first piston (e.g., the first chamber may be a variable-volume space between an end of the first piston, a sidewall of the first cylinder assembly, and a closed end of the first cylinder assembly), while the second crankcase compartment is fluidly connectable with a second chamber that is collectively defined at least in part by the second cylinder assembly and the second piston (e.g., the second chamber may be a variable-volume space between an end of the second piston, a sidewall of the second cylinder assembly, and a closed end of the second cylinder assembly). A first airflow path extends from an exterior of the UAV propulsion system (e.g., an environment in which the UAV is being operated) to the first crankcase compartment, a second airflow path extends from the exterior of the UAV propulsion system to the second crankcase compartment, and the first airflow path is separate from the second airflow path. Ambient air may be separately directed into each of the first airflow path and the second airflow path.

The first crankcase compartment may be characterized as being at least substantially fluidly isolated from the second crankcase compartment. The first crankcase compartment may be characterized as being dedicated to the first chamber (e.g., collectively defined by the first cylinder assembly and the first piston), while the second crankcase compartment may be characterized as being dedicated to the second chamber (e.g., collectively defined by the second cylinder assembly and the second piston). An annular seal may be disposed between the first crankcase compartment and the second crankcase compartment, such as purposes of the foregoing characterizations. A first disc may be mounted on/rotatable with the crankshaft, and an annular seal may be disposed on a perimeter of this first disc (e.g., disposed in closely spaced relation to and/or engaged with a corresponding portion of the crankcase). Another option is for an annular seal to be attached to an interior of the crankcase, for the crankshaft to include a first disc (e.g., mounted on and rotatable with the crankshaft) that is aligned with this seal, for the first crankcase compartment to be disposed on a first side of the seal, and for the second crankcase compartment to be disposed on an opposite, second side of this seal.

At least one fuel injector may be fluidly connected with the first chamber (e.g., collectively defined by the first cylinder assembly and the first piston), and at least one fuel injector may be fluidly connected with the second chamber (e.g., collectively defined by the second cylinder assembly and the second piston). Each of the first and second chambers may have one or more dedicated fuel injectors. These fuel injectors may inject an appropriate fuel (e.g., a heavy fuel) that is directly or indirectly provided to the corresponding chamber.

The UAV propulsion system may further include a first rotary valve and a second rotary valve. These rotary valves may be one or more of mounted on/rotatable with the crankshaft and/or spaced along a length dimension of the crankshaft. The first rotary valve may control the airflow into/along the first airflow path and thereby into the first crankcase compartment, while the second rotary valve may control the airflow into/along the second airflow path and thereby into the second crankcase compartment. The first rotary valve may be characterized as being dedicated to the first airflow path, while the second rotary valve may be characterized as being dedicated to the second airflow path. The flow of air into/through the first airflow path and the flow of air into/through the second airflow path may thereby be separately controlled.

The first airflow path may include/utilize a first intake housing, while the second airflow path may include/utilize a second intake housing. The first and second intake housings may be disposed on an exterior of the UAV propulsion system for purposes of providing separate airflow inlets to the UAV propulsion system. The first and second intake housings may be characterized as being spaced along a length dimension of the UAV propulsion system (e.g., corresponding with a length dimension of the crankshaft). The first intake housing may be disposed on a first side of the first cylinder assembly (relative to a length dimension of the UAV propulsion system), while the second intake housing may be disposed on an opposite, second side of the first cylinder assembly (again, relative to the length dimension of the UAV propulsion system). For instance, the first cylinder assembly may be characterized as being disposed between the first intake housing and the second intake housing proceeding along the length dimension of the UAV propulsion system. When the UAV propulsion system is disposed in an "upright" orientation, an inlet to the first intake housing may project at least upwardly, while an inlet to the second intake housing may project at least downwardly.

The UAV propulsion system may be utilized by a UAV airframe of any appropriate configuration, such as a push-type UAV configuration (e.g., an airframe that is pushed through the air such as by a propeller that is rotated by the UAV propulsion system, for instancing by mounting the propeller to a propeller hub that in turn is mounted on an end of the crankshaft of the UAV propulsion system), and a pull-type UAV configuration (e.g., an airframe that is pulled through the air such as by a propeller that is rotated by the UAV propulsion system, for instancing by mounting the propeller to a propeller hub that in turn is mounted on an end of the crankshaft of the UAV propulsion system). Such a UAV airframe may include a sensor system, a flight computer that includes at least one processor that is operatively interconnected with this sensor system, at least one adjustable flight control surface, an actuator system that is operatively interconnected with the flight computer and that is interconnected with at least one adjustable flight control surface, and an antenna system.

Various aspects of the present invention are also addressed by the following paragraphs and in the noted combinations:

1. A UAV propulsion system, comprising:
   a crankcase comprising a first crankcase compartment and a separate second crankcase compartment;
   a rotatable crankshaft;
   a first cylinder assembly;
   a first piston interconnected with said crankshaft, disposed within said first cylinder assembly, and reciprocable relative to said first cylinder assembly to rotate said crankshaft, wherein said first cylinder assembly and said first piston collectively define a first chamber;
   at least one first port extending from said first crankcase compartment to said first chamber;
   a second cylinder assembly;
   a second piston interconnected with said crankshaft, disposed within said second cylinder assembly, and reciprocable relative to said second cylinder assembly to rotate said crankshaft, wherein said second cylinder assembly and said second piston collectively define a second chamber;
   at least one second port extending from said second crankcase compartment to said second chamber;
   a first airflow path extending from an exterior of said UAV propulsion system to said first crankcase compartment;
   a second airflow path extending from said exterior of said UAV propulsion system to said second crankcase compartment, wherein said first airflow path is completely separate from said second airflow path; and
   a propeller hub mounted to said crankshaft and adapted to receive a propeller.

2. The UAV propulsion system of paragraph 1, wherein said first crankcase compartment is at least substantially fluidly isolated from said second crankcase compartment.

3. The UAV propulsion system of any of paragraphs 1-2, wherein said first crankcase compartment is dedicated to said first chamber collectively defined by said first cylinder assembly and said first piston, and wherein said second crankcase compartment is dedicated to said second chamber collectively defined by said second cylinder assembly and said second piston.

4. The UAV propulsion system of any of paragraphs 1-3, further comprising a first disc that rotates with said crankshaft and an annular seal disposed on a perimeter of said first disc, wherein said first crankcase compartment is disposed on a first side of said seal and said second crankcase compartment is disposed on an opposite, second side of said seal.

5. The UAV propulsion system of paragraph 4, wherein said seal interfaces with an interior surface of said crankcase.

6. The UAV propulsion system of any of paragraphs 4-5, wherein said seal collectively rotates with said crankshaft.

7. The UAV propulsion system of any of paragraphs 1-3, further comprising:
   an annular seal attached to an interior of said crankcase, wherein said crankshaft comprises a first disc that is aligned with said seal, and wherein said first crankcase compartment is disposed on a first side of said seal and said second crankcase compartment is disposed on an opposite, second side of said seal.

8. The UAV propulsion system of any paragraphs 4-7, wherein said first disc comprises first and second crankpins that extend in opposite directions, wherein said first crankpin is mounted to a connecting rod for said first piston, and wherein said second crankpin is mounted to a separate connecting rod for said second piston.
9. The UAV propulsion system of any of paragraphs 4-8, wherein said seal is formed from a first material and said crankcase is formed from a second material that is different than said first material.
10. The UAV propulsion system of any of paragraphs 4-9, wherein said seal is formed from a material selected from the group consisting of rubber, silicone, PTFE, ceramic, nitrile, Viton, FEP, metal alloy, fluorocarbon, and elastomeric materials.
11. The UAV propulsion system of paragraph 10, wherein said crankcase is a casting.
12. The UAV propulsion system of any of paragraphs 1-11, further comprising a first fuel injector mounted to a base of said first cylinder assembly and a second fuel injector mounted to a base of said second cylinder assembly.
13. The UAV propulsion system of paragraph 12, wherein said first and second fuel injectors inject a heavy fuel for said first and second chambers, respectively.
14. The UAV propulsion system of any of paragraphs 1-11, wherein said at least one first port comprises a plurality of first transfer ports, and wherein said at least one second port comprises a plurality second transfer ports.
15. The UAV propulsion system of paragraph 14, further comprising a first fuel injector and a second fuel injector, wherein said first fuel injector injects fuel directly into one of said first transfer ports that is on a same side of said first cylinder assembly as said first fuel injector, and wherein said second fuel injector injects fuel directly into one of said second transfer ports that is on a same side of said second cylinder assembly as said second fuel injector.
16. The UAV propulsion system of paragraph 14, further comprising a first fuel injector and a second fuel injector, wherein said first fuel injector injects fuel into one of said first transfer ports that is on an opposite side of said first cylinder assembly compared to said first fuel injector, and wherein said second fuel injector injects fuel into one of said second transfer ports that is on an opposite side of said second cylinder assembly compared to said second fuel injector.
17. The UAV propulsion system of paragraph 16, wherein said first fuel injector injects said fuel through said first piston and then into said one of said first transfer ports that is on said opposite side of said first cylinder assembly compared to said first fuel injector, and wherein said second fuel injector injects said fuel through said second piston and then into said one of said second transfer ports that is on said opposite side of said second cylinder assembly compared to said second fuel injector.
18. The UAV propulsion system of any of paragraphs 1-11, wherein said at least one first port comprises a pair of first transfer ports that are oppositely disposed and a first boost port, and wherein said at least one second port comprises a pair of second transfer ports that are oppositely disposed and a second boost port.
19. The UAV propulsion system of paragraph 18, further comprising a first fuel injector and a second fuel injector, wherein said first fuel injector injects fuel directly into one of said first transfer ports that is on a same side of said first cylinder assembly as said first fuel injector, and wherein said second fuel injector injects fuel directly into one of said second transfer ports that is on a same side of said second cylinder assembly as said second fuel injector.
20. The UAV propulsion system of paragraph 18, further comprising a first fuel injector and a second fuel injector, wherein said first fuel injector injects fuel into one of said first transfer ports that is on an opposite side of said first cylinder assembly compared to said first fuel injector, and wherein said second fuel injector injects fuel into one of said second transfer ports that is on an opposite side of said second cylinder assembly compared to said second fuel injector.
21. The UAV propulsion system of paragraph 18, wherein said first fuel injector injects said fuel through said first piston and then into said one of said first transfer ports that is on said opposite side of said first cylinder assembly compared to said first fuel injector, wherein said second fuel injector injects said fuel through said second piston and then into said one of said second transfer ports that is on said opposite side of said second cylinder assembly compared to said second fuel injector.
22. The UAV propulsion system of any of paragraphs 15-17 and 19-21, wherein said first and second fuel injectors inject a heavy fuel for said first and second chambers, respectively.
23. The UAV propulsion system of any of paragraphs 1-22, wherein said first cylinder assembly comprises a first exhaust port fluidly connectable with said first chamber and said second cylinder assembly comprises a second exhaust port fluidly connectable with said second chamber.
24. The UAV propulsion system of any of paragraphs 1-23, further comprising a first rotary valve and a second rotary valve that are each mounted on and rotatable with said crankshaft.
25. The UAV propulsion system of paragraph 24, wherein said first rotary valve and second rotary valve are spaced along a length of said crankshaft.
26. The UAV propulsion system of any of paragraphs 24-25, wherein said first rotary valve is dedicated to said first airflow path and said second rotary valve is dedicated to said second airflow path.
27. The UAV propulsion system of any of paragraphs 24-26, wherein said first rotary valve controls an airflow along said first airflow path and to said first crankcase compartment, and said second rotary valve controls an airflow along said second airflow path and to said second crankcase compartment.
28. The UAV propulsion system of any of paragraphs 24-27, wherein each of said first and second rotary valves are sequentially disposable from an open position, to a partially open position, to a closed position, back to a partially open position, and back to said open position.
29. The UAV propulsion system of any of paragraphs 24-28, wherein said first and second rotary valves each comprise a cutout that is rotatable into and out of alignment with said first airflow path and said second airflow path, respectively.
30. The UAV propulsion system of any of paragraphs 24-29, wherein an air-fuel mixture flowing through said first airflow path is heated prior to reaching said first rotary valve and an air-fuel mixture flowing through said second airflow path is heated prior to reaching said second rotary valve.

31. The UAV propulsion system of any of paragraphs 1-30, further comprising:
a first intake housing that comprises said first airflow path; and
a second intake housing that comprises said second airflow path.
32. The UAV propulsion system of paragraph 31, wherein a rotational axis of said crankshaft defines a length dimension of said UAV propulsion system, and wherein said first intake housing and said second intake housing are spaced from one another in said length dimension.
33. The UAV propulsion system of paragraph 32, wherein said first intake housing is disposed on a first side of said first cylinder assembly in said length dimension, and wherein said second intake housing is disposed on an opposite, second side of said first cylinder assembly in said length dimension.
34. The UAV propulsion system of any of paragraphs 31-33, wherein an open end of said first intake housing projects in a direction that a head of said second cylinder assembly is spaced from said crankshaft, and wherein an open end of said second intake housing projects in a direction that a head of said first cylinder assembly is spaced from said crankshaft.
35. The UAV propulsion system of paragraph 34, wherein said open end of said first intake housing further projects in one of a travel direction of said UAV propulsion system or a trailing direction that is opposite of said travel direction, and wherein said open end of said second intake housing further projects in the other of said travel direction of said UAV propulsion system or said trailing direction.
36. The UAV propulsion system of any of paragraphs 1-35, wherein said first cylinder assembly and said second cylinder assembly are spaced along said crankshaft, and wherein said first and second pistons move along parallel paths.
37. The UAV propulsion system of any of paragraphs 1-36, further comprising a propulsion unit control system that comprises at least one processor.
38. The UAV propulsion system of paragraph 37, wherein said propulsion unit control system is configured to send control signals to actuator motors in order to adjust engine operation.
39. The UAV propulsion system of any of paragraphs 1-38, further comprising a propeller mounted to said propeller hub.
40. A UAV comprising an airframe and the UAV propulsion system of any of paragraphs 1-39.
41. The UAV of paragraph 40, wherein said UAV propulsion system is integrated to provide a push-type configuration for said UAV.
42. The UAV of paragraph 40, wherein said UAV propulsion system is integrated to provide a pull-type configuration for said UAV.
43. The UAV of any of paragraphs 40-42, wherein said airframe is selected from the group consisting of a fixed-wing configuration and a rotary-wing configuration.
44. The UAV of any of paragraphs 40-43, wherein said airframe further comprises a sensor system, a flight computer that comprises at least one processor and that is operatively connected with said sensor system, at least one adjustable flight control surface, an actuator system operatively interconnected with said flight computer and interconnected with said at least one adjustable flight control surface, and an antenna system.
45. The UAV of paragraph 44, wherein said flight computer is configured to control flight of said UA and is further configured to use data from said sensor system to estimate a position and orientation of said UAV.
46. The UAV of any of paragraphs 40-45, further comprising at least one fuel tank.
47. The UAV of paragraph 46, further comprising a heavy fuel in said at least one fuel tank.

BRIEF DESCRIPTION OF THE DRAWINGS

FIG. 3A is perspective view of an embodiment of a UAV having a propulsion system with dual rotary valves for controlling airflow into separate compartments of a crankcase.
FIG. 3B is a top view of the UAV illustrated in FIG. 3A.

DETAILED DESCRIPTION

Figure 1A:
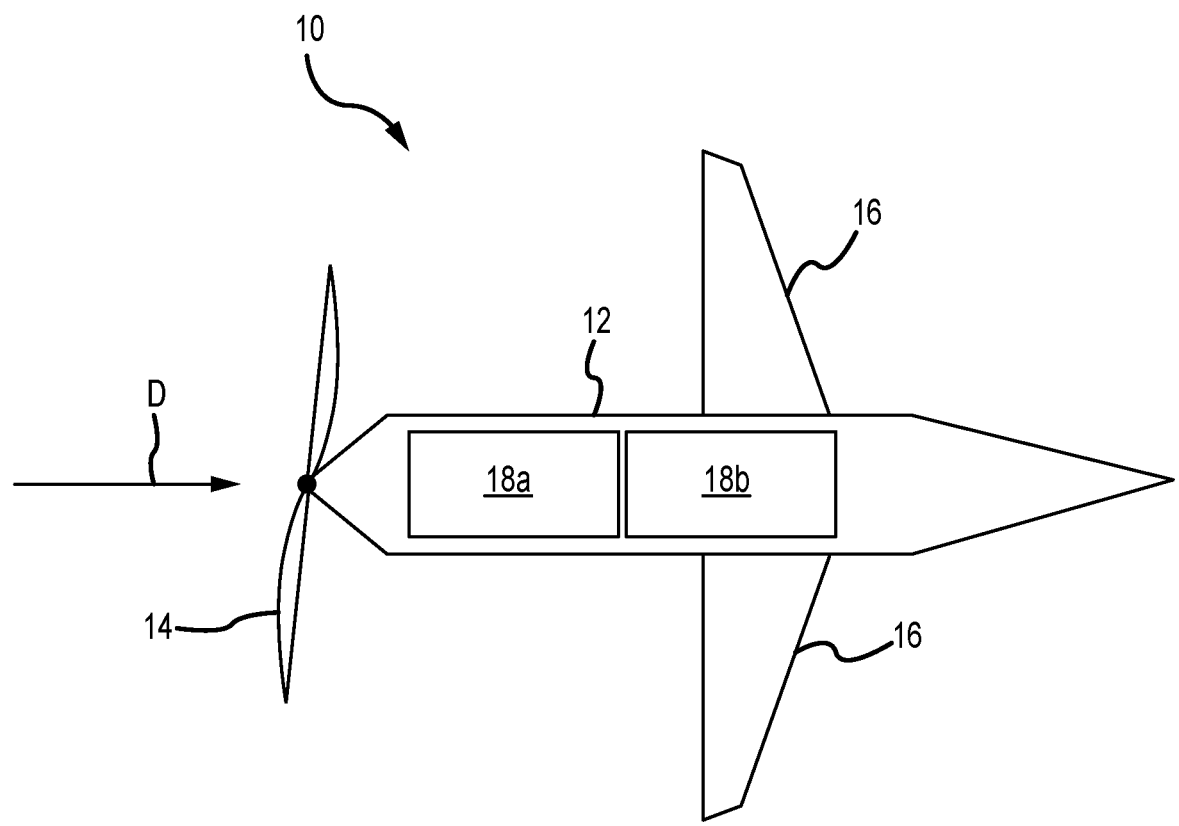
FIG. 1A is a schematic of a UAV in a push-type configuration.

FIG. 1A is a schematic of one embodiment of an unmanned aircraft system or unmanned aerial vehicle (hereafter "UAV 10"). The UAV 10 includes an airframe 12 having a pair of fixed wings 16, along with a propulsion system that includes a propeller 14, an engine 18a, and a propulsion unit control system 18b. Rotation of the propeller 14 (by operation of the engine 18a via the propulsion unit control system 18b) advances the UAV 10 in the direction indicated by the arrow D. The propeller 14 is incorporated by the airframe 12 such that the UAV 10 is of a push-type configuration (e.g., the airframe 12 is "pushed" by rotation of the propeller 14).

Figure 1B:
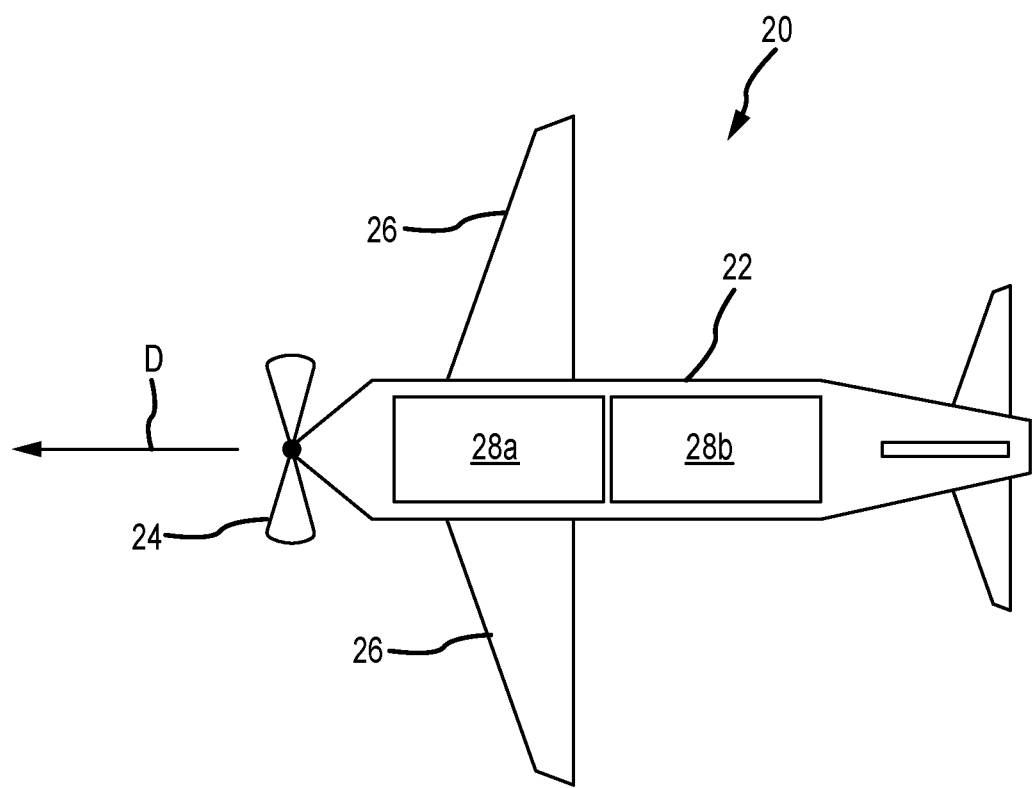
FIG. 1B is a schematic of a UAV in a pull-type configuration.

FIG. 1B is a schematic of another embodiment of an unmanned aircraft system or unmanned aerial vehicle (hereafter "UAV 20"). The UAV 20 includes an airframe 22 having a pair of fixed wings 26, along with a propulsion system that includes a propeller 24, an engine 28a, and a propulsion unit control system 28b. Rotation of the propeller 24 (by operation of the engine 28a via the propulsion unit control system 28b) advances the UAV 20 in the direction indicated by the arrow D. The propeller 24 is incorporated by the airframe 22 such that the UAV 20 is of a pull-type configuration (e.g., the airframe 22 is "pulled" by rotation of the propeller 24).

Figure 2A:
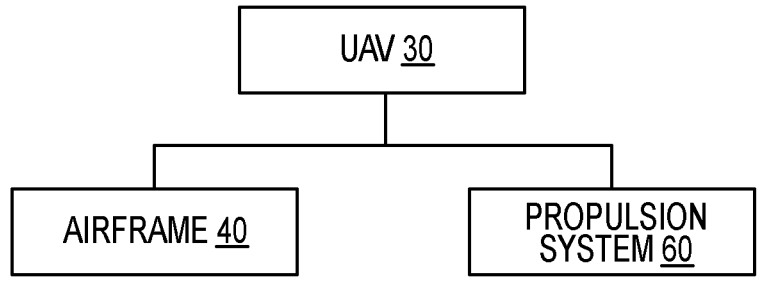
FIG. 2A is a functional schematic of a UAV.

A functional schematic of an unmanned aerial vehicle or UAV 30 is presented in FIG. 2A, and may be utilized by the fixed wing UAV embodiments of FIGS. 1A and 1B as well by rotary wing UAV configurations. There are two primary components of the UAV 30, namely an airframe 40 and a propulsion system 60 that is mounted to the airframe 40. The propulsion system 60 may be configured in a pull-type configuration or may be configured in a push-type configuration.

Figure 2B:
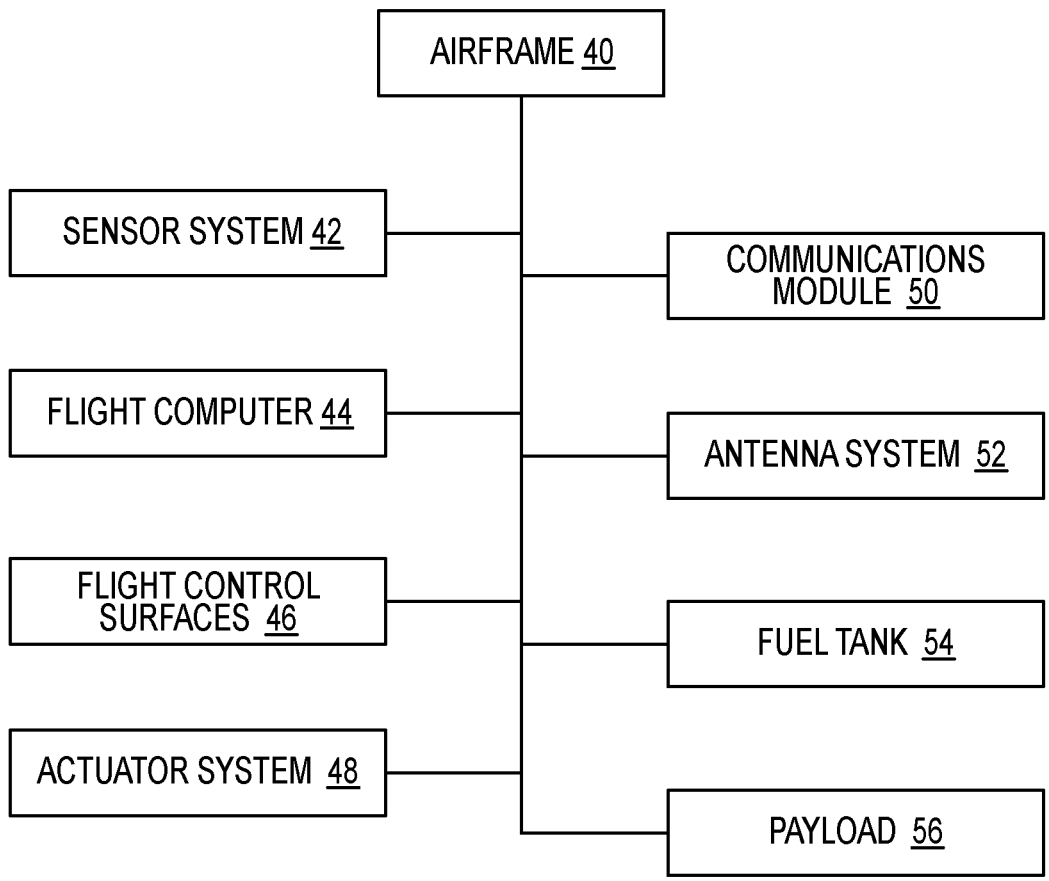
FIG. 2B is a functional schematic of an airframe for the UAV of FIG. 2A.

A representative functional schematic of the airframe 40 for the UAV 30 is presented in FIG. 2B. The airframe 40 may be of any appropriate configuration for the target application(s), and includes what may be characterized as a number of subsystems. The illustrated subsystems for the airframe 40 include a sensor system 42, a flight computer or control system 44, at least one and typically multiple flight control surfaces/structures 46, an actuator system 48, a communications module 50, an antenna system 52, a fuel tank 54 for the case where the propulsion system 60 includes an internal combustion engine or the like, and typically a payload 56. The payload 56 may be of any appropriate type, such as a fixed or gimbaled video camera.

The sensor system 42 of the airframe 40 may be used to calculate/estimate the kinematic state of the UAV 30. Representative sensors for the sensor system 42 include a GPS antenna and receiver (to calculate/estimate the UAV 30 position and velocity in global coordinates), gyros and accelerometers (e.g., to calculate/estimate the attitude (pitch and roll) of the UAV 30), and magnetometers (e.g., to calculate/estimate yaw angle of the UAV 30). A UAV magnetometer may be characterized as measuring the position of the UAV 30, a UAV altimeter may be characterized as measuring the air speed and altitude of the UAV 30, and a UAV inertial unit may be characterized as measuring movements of the UAV 30, and each of which may be part of the sensor system 42. Other sensors may be used by the sensor system 42 to collect desired data for the target application(s). Data acquired by the sensor system 42, as well as any data acquired by the payload 56 (e.g., imagery), may be stored on the UAV 30 but more typically will be transmitted (e.g., wireless telemetry) to one or more off-board stations, remote controllers or the like (e.g., a ground control station).

The flight computer 44 of the airframe 40 may be characterized as the "brain" of the airframe 40 or UAV 30, and includes one or more processors and utilizing any appropriate processing architecture. The flight computer 44 may use data acquired by the sensor system 42 to estimate the current position and orientation of the UAV 30. The flight computer 44 may also be used to control the flight of the UAV 30 (e.g., via receipt of flight commands). In this regard, the flight computer 44 may provide a control signal(s) to the propulsion system 60 via a propulsion unit control system 290 (FIG. 4, and in accord with the propulsion unit control system 18b of FIG. 1A or the propulsion unit control system 28b of FIG. 1B), as well as to translate flight commands into actuator commands that are sent to the actuator system 48 to adjust one or more of the flight control surfaces 46 of the UAV 30 or to simply transmit actuator commands to the actuator system 48 to adjust one or more of the flight control surfaces 46 of the UAV 30. In a fixed wing configuration of the UAV 30, these flight control surfaces 46 may include an elevator for controlling the pitch (a lateral axis) of the UAV 30, ailerons for controlling the roll (longitudinal axis) of the UAV 30, and a rudder for controlling the yaw (vertical axis) of the UAV 30. In a rotary wing configuration of the UAV 30, these flight control surfaces 46 may include one or more of its rotor blades. Finally, the flight computer 44 may be used to control operation of the payload 56.

The flight computer 44 may be configured with a flight control algorithm to provide for a programmed control of the flight of the UAV 30, may be configured to incorporate or interface with an autopilot system, the UAV 30 to be remotely controlled from one or more remote locations (remote meaning "off-board" the UAV 30), or a combination thereof. In this regard, the airframe 40 includes a communications module 50 and an antenna system 52 of any appropriate type to accommodate communication (e.g., wireless) between the UAV 30 and one or more off-board stations, remote controllers, or the like (e.g., a ground control station, an airborne control station, or both). The communications module 50 and antenna system 52 allow for receipt of flight commands from an off-board or remote controller(s), receipt of payload control commands from an off-board or remote controller(s), or both. As noted, the communications module 50 and antenna system 52 may also be used to transmit data (e.g., from the sensor system 42; from the payload 56) to one or more off-board stations, remote controllers or the like.

Figure 2C:
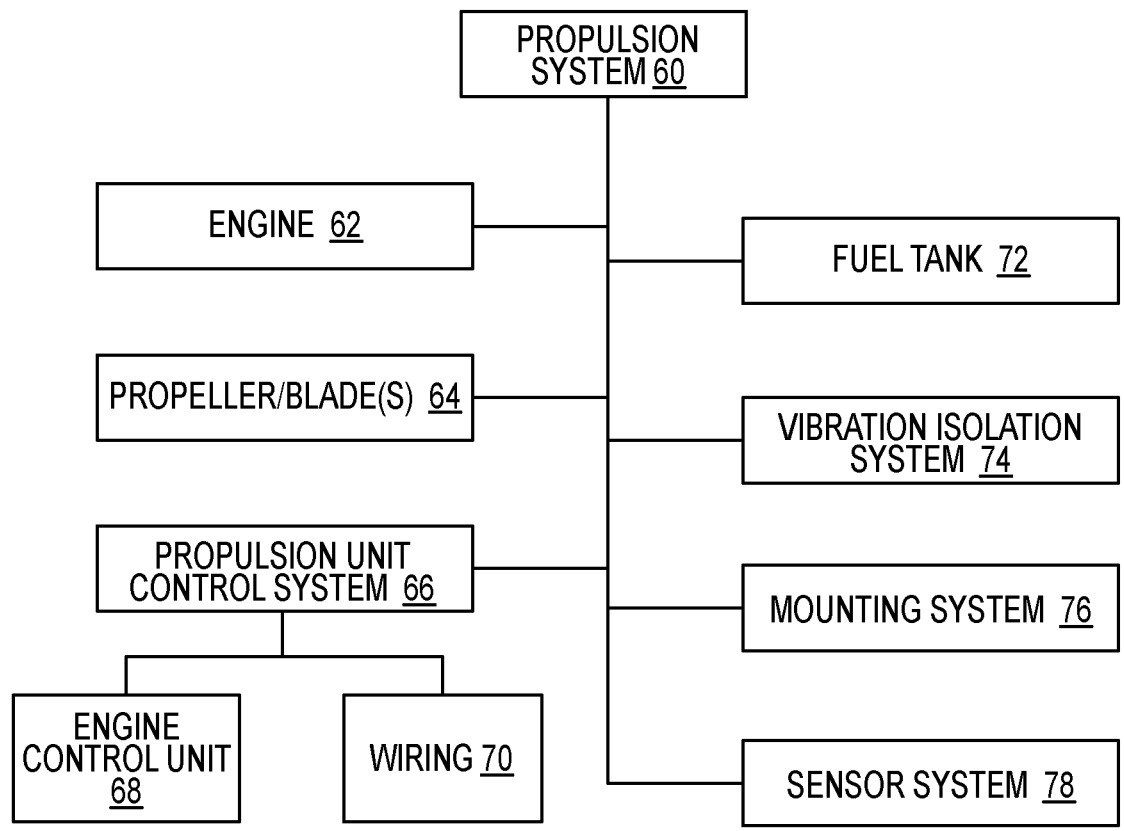
FIG. 2C is a functional schematic of a propulsion system for the UAV of FIG. 2A.

A representative functional schematic for the propulsion system 60 of the UAV 30 is presented in FIG. 2C. The propulsion system 60 may be configured in a pull-type configuration or may be configured in a push-type configuration. Components of the propulsion system 60 include an engine 62, at least one propeller or blade 64, a propulsion unit control system 66, a vibration isolation system 74, and a mounting system 76. The propulsion system 60 may be separately attached to the airframe 40 by its mounting system 76 (e.g., a mounting ring). The vibration isolation system 74 may be disposed between and structurally interconnect the mounting system 76 with the engine 62, for instance to vibrationally decouple the engine 62 from the airframe 40. The vibration isolation system 74 may also be characterized as being disposed between and structurally interconnecting the engine 62 and the propulsion unit control system 66 to prevent unintended vibration of the propulsion unit control system 66.

The engine 62 may be in the form of an internal combustion engine. An appropriate fuel may be contained within a fuel tank 72 of the propulsion system 60. The fuel tank 72 may be of a smaller capacity than the fuel tank 54 for the airframe 40 (FIG. 2B). The fuel tank 54 of the airframe 40 may be referred to as the primary fuel tank, while the fuel tank 72 of the propulsion system 60 may be referred to as an auxiliary fuel tank or a header tank. The UAV 30 may include one or more fuel tanks of any appropriate capacity and incorporated in any appropriate manner. The primary fuel tank (e.g., fuel tank 54) may be fluidically coupled to one or more auxiliary fuel tanks (e.g., header tank 72), and a pump or other appropriate apparatus may be used to convey fuel from the primary tank to the auxiliary fuel tank(s).

The propulsion unit control system 66 may be characterized as the "brain" of the propulsion system 60, may receive control signals from the flight computer 44 of the airframe 40, and includes one or more processors and utilizing any appropriate processing architecture. The propulsion unit control system 66 includes an engine control unit 68 (for controlling operation of the engine 62 and its associated components), as well as wiring 70 for the propulsion system 60. More specifically, the propulsion unit control system 66 may be used to send one or more control signals to actuator motors in order to adjust engine operation. This may include adjusting the degree of opening of an air inlet or cooling shroud(s) in response to engine temperature above or below a threshold temperature, or it may include adjusting the engine throttle in response to a demand for increased or decreased engine power.

The propulsion system 60 may also include a sensor system 78 that may be used to provide indications of engine operating parameters including, but not limited to, engine oil temperature, coolant temperature, engine rotational speed, cylinder head temperature, and throttle position. The propulsion unit control system 66 may then provide a control signal to associated actuator motors to control engine operation responsive to these inputs.

Figure 3C:
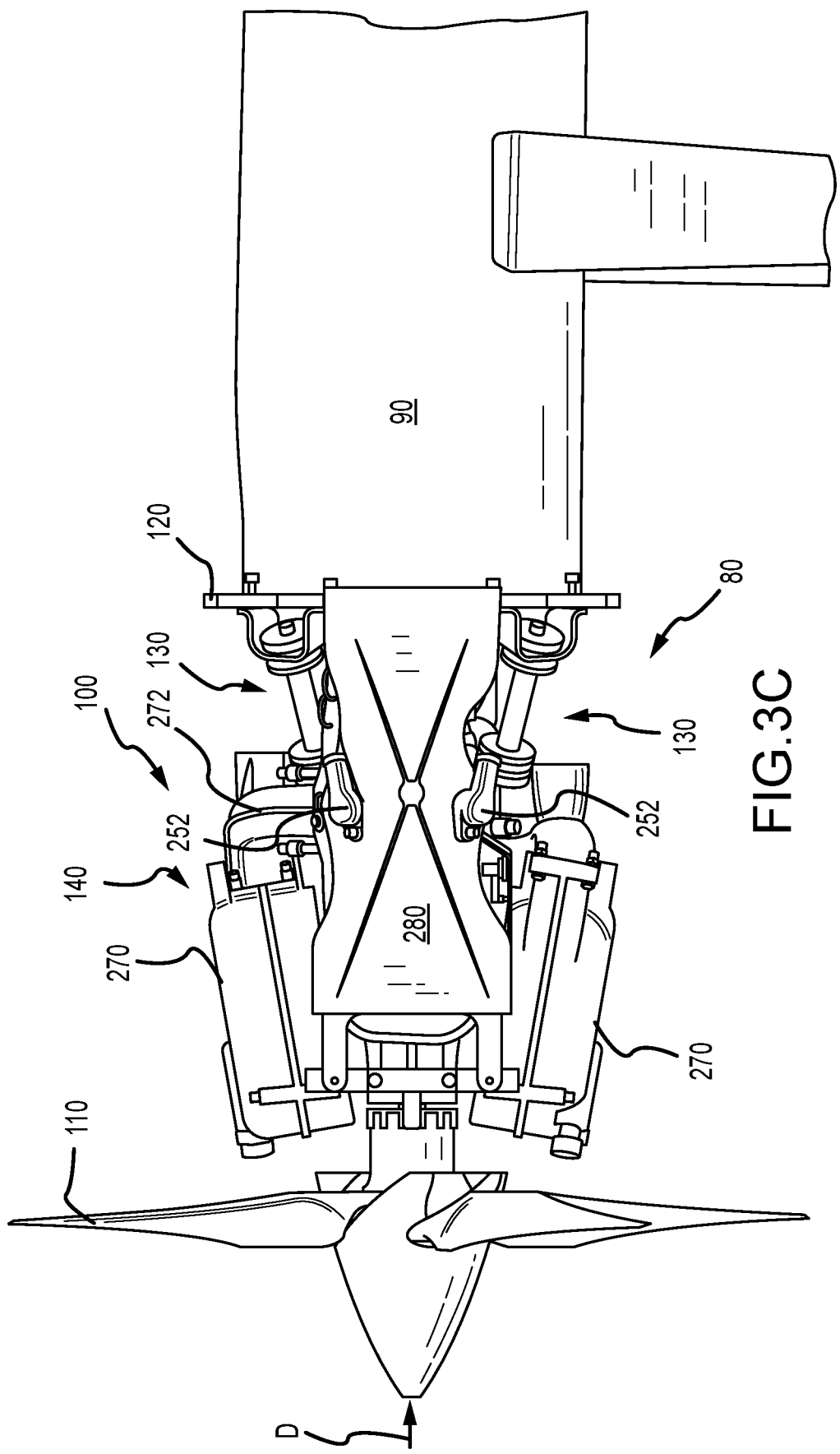
FIG. 3C is a side view of the UAV illustrated in FIG. 3A.

One embodiment of an unmanned aircraft system or unmanned aerial vehicle (AV) is illustrated in FIGS. 3A-3C and is identified by reference numeral 80 (and which may be in accordance with the UAV 30 discussed above in relation to FIG. 2A unless noted to the contrary herein). The two primary components of the UAV 80 include an airframe 90 (which may be in accordance with the airframe 40 discussed above in relation to FIG. 2B unless noted to the contrary herein) and a propulsion module or system 100 (which may be in accordance with the propulsion system 60 discussed above in relation to FIG. 2C unless noted to the contrary herein). The airframe 90 may be of any appropriate configuration (e.g., fixed wing, rotary wing). The propulsion system 100 is mounted to the airframe 90 using a mounting ring 120. A vibration isolation system 130 is disposed between and structurally interconnects the engine 140 with the airframe 90 (e.g., to vibrationally decouple the engine 140 from the airframe 90; to prevent unintended vibration of a propulsion unit control system 290 for the engine 140 (FIG. 4)).

Figure 4:
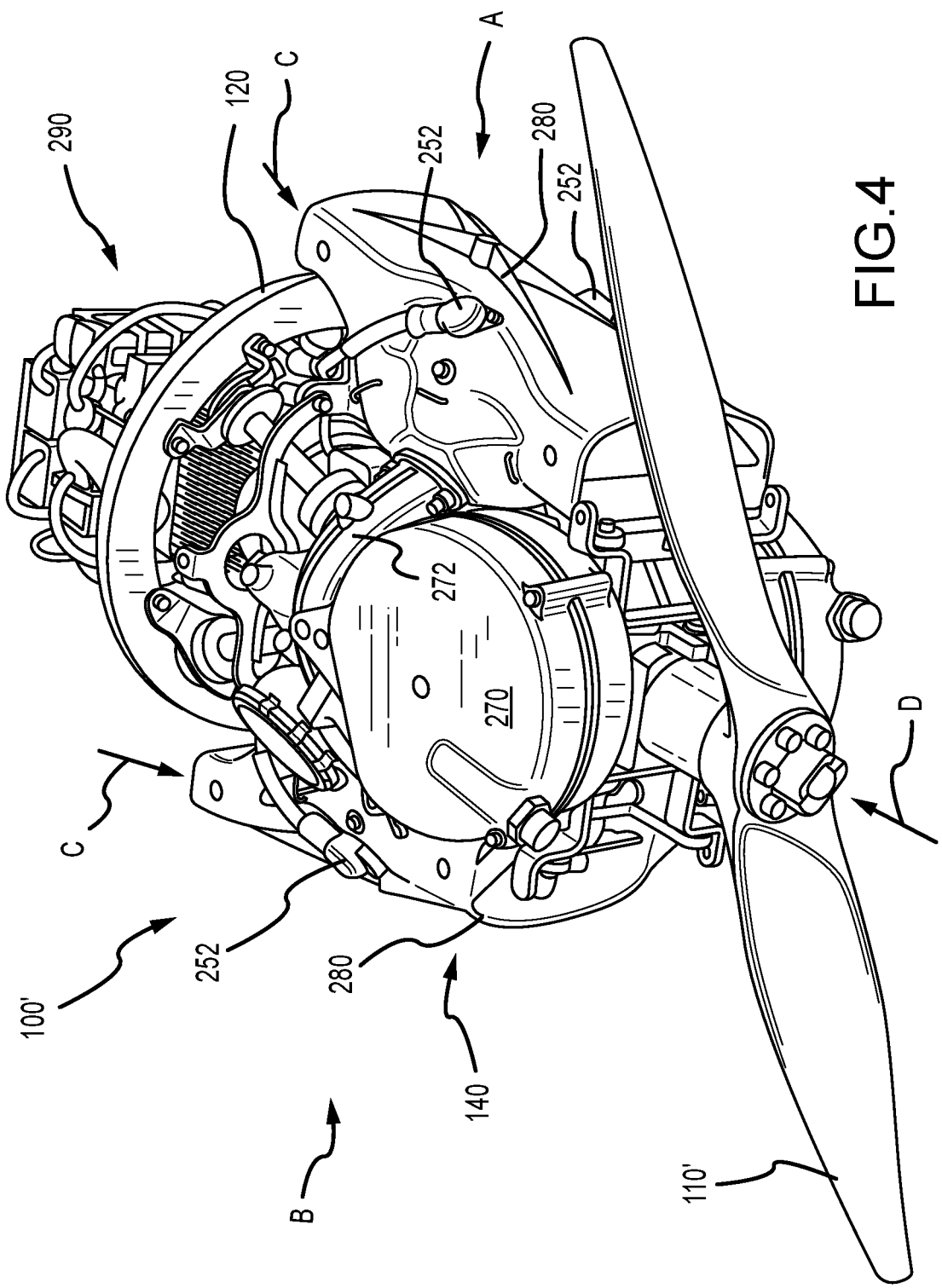
FIG. 4 is a perspective view of a variation of the propulsion system used by the UAV of FIG. 3A.

The propulsion system 100 includes a propeller 110 and an engine 140 (FIGS. 3A-3C), along with the noted propulsion unit control system 290 (FIG. 4). Operation of the engine 140 (via the propulsion unit control system 290) rotates the propeller 110, to in turn advance the UAV 80 in the direction indicated by the arrow D for the illustrated embodiment. This may be referred to as a "push-type configuration." It will be appreciated that the propulsion system 100 may be used for other UAV configurations as well, including what may be referred to as a "pull-type configuration" (e.g., FIG. 1B).

The engine 140 for the propulsion system 100 may be in the form of an internal combustion engine and may use any appropriate fuel. However, features of the propulsion system 100 accommodate the use of a heavy fuel for a UAV application and for the illustrated multi-cylinder configuration. Representative heavy fuels for the propulsion system 100 include without limitation kerosene-based fuel, #1 diesel fuel, #2 diesel fuel, JP8, JP5, or Jet A/A1. Use of a heavy fuel for a UAV application may provide the benefit of lower fuel consumption, ease of transportation to and storage at remote locations in part because heavy fuel is less prone to unintended combustion, and cold start capability. Additionally, it is typically less expensive than other types of fuel, and heavy fuel is widely used in military/maritime industries and applications, and as UAVs become more widely used in these industries it is appropriate to also operate the UAVs using heavy fuel.

The engine 140 may be characterized as having an A side (designated by the arrow A) and a B side (designated by the arrow B), with FIG. 3C being a side view of the A side of the engine 140. One cylinder/piston is on the A side of the engine 140, while another cylinder/piston is on the B side of the engine 140. The engine 140 has a cooling shroud 280 and muffler 270 (and a corresponding exhaust header 272) associated with its A side, and a separate cooling shroud 280 and muffler 270 (and a corresponding exhaust header 272) associated with its B side. The cooling shrouds 280 are used to control the temperature of the engine 140 by directing an airflow (e.g., over/around the corresponding cylinder and/or head) in the direction indicated by the arrow C. The flow of ambient air through each of the cooling shrouds 280 may be appropriately throttled (to accommodate an increase of the temperature of the engine 140; to accommodate a decrease of the temperature of the engine 140). In one example, throttling the flow of ambient air through each of the cooling shrouds 280 may be performing by adjusting the opening of one or more doors positioned in the inlet and/or the outlet of the cooling shroud 280. Any appropriate number of spark plugs 252 may be associated with the A side of the engine 140 (two in the illustrated embodiment), while any appropriate number of spark plugs 252 may be associated with the B side of the engine 140 (two in the illustrated embodiment, with one of the two not shown).

FIG. 4 is a perspective view of a variation of the propulsion system 100 that is illustrated in FIGS. 3A-3C, and is thereby further identified by "single prime" designation. The primary difference between the propulsion system 100' of FIG. 4 and the propulsion system 100 of FIGS. 3A-3C is that the propulsion system 100' utilizes a propeller 110' of a different configuration than is shown in FIGS. 3A-3C. FIG. 4 also shows a propulsion unit control system 290 for the propulsion system 100 (e.g., in accordance with the propulsion unit control system 66 discussed above in relation to FIG. 2C)

Figure 5:
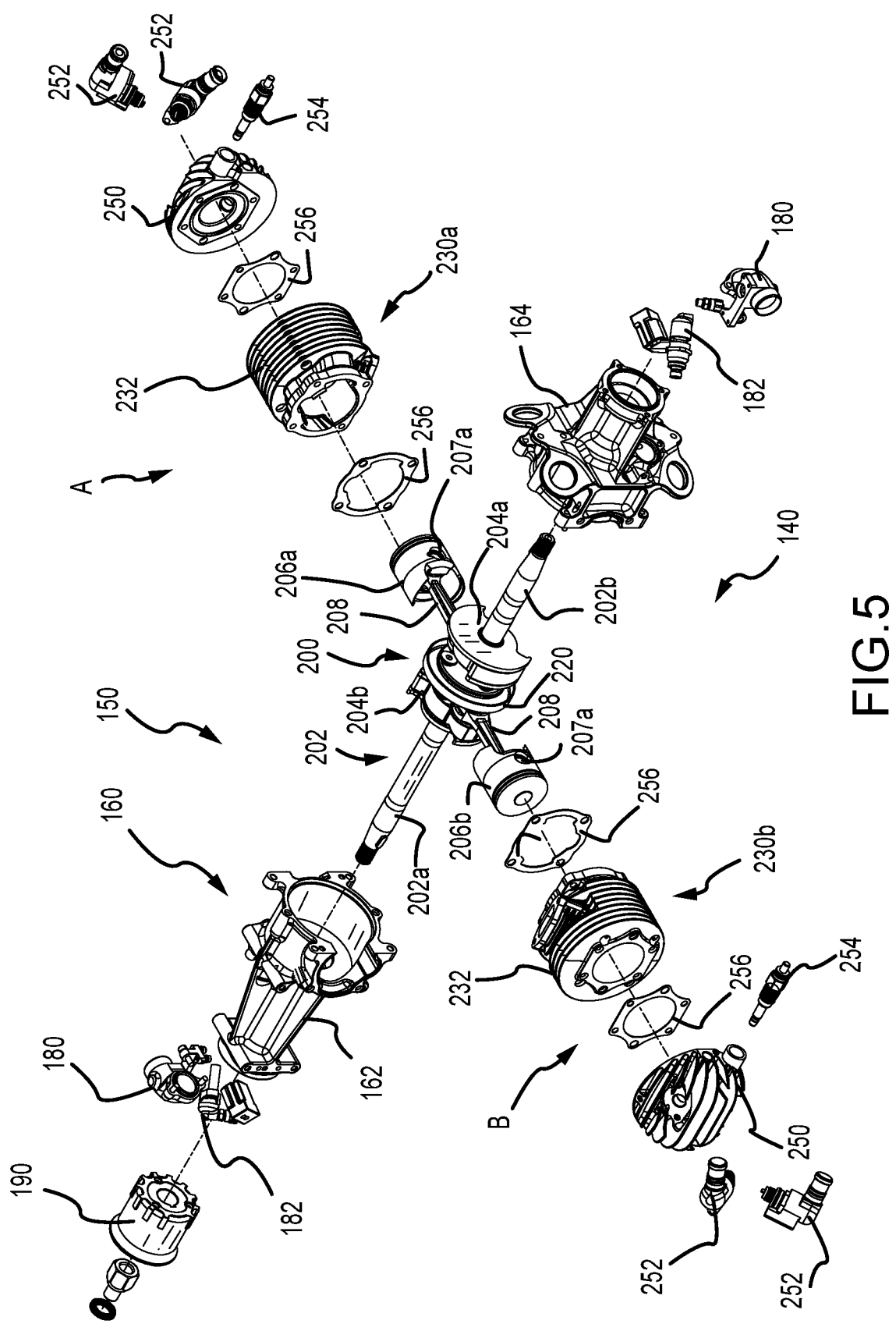
FIG. 5 is an exploded, perspective view of a core assembly of an engine for a propulsion system of the UAV of FIG. 3A.

One embodiment of a core assembly for the engine 140 (e.g., FIGS. 3A-3C) of the noted propulsion system 100 is illustrated in FIG. 5 and is identified by reference numeral 150. Components of the core assembly 150 include a crankcase 160, a crank assembly 200, a cylinder assembly 230*a* associated with the A side of the engine 140, and a separate cylinder assembly 230*b* associated with the B side of the engine 140. The crankcase 160 includes a first crankcase section or housing 162 and a second crankcase section or housing 164. As will be discussed in more detail below, the interior of the crankcase 160 is separated into a pair of separate chambers or compartments—one chamber or compartment for the cylinder assembly 230*a* (A side of the engine 140) and another chamber or compartment for the cylinder assembly 230*b* (B side of the engine 140). One throttle body 180 and fuel injector 182 are appropriately mounted to the first crankcase section 162, while another throttle body 180 and fuel injector 182 are appropriately mounted to the second crankcase section 164.

A piston 206a and rotary valve 204a for the cylinder assembly 230a are each interconnected with the crank assembly 200. Reciprocation of the piston 206a relative to its corresponding cylinder assembly 230a rotates the crank assembly 200. The rotary valve 204a that is associated with the cylinder assembly 230a is incorporated so as to simultaneously rotate with the crank assembly 200. Similarly, a piston 206b and rotary valve 204b for the cylinder assembly 230b are each also interconnected with the crank assembly 200. Reciprocation of the piston 206b relative to its corresponding cylinder assembly 230b rotates the crank assembly 200. The rotary valve 204b that is associated with the cylinder assembly 230b is incorporated so as to simultaneously rotate with the crank assembly 200. A propeller hub 190 is mounted to and is rotated by rotation of the crank assembly 200. The propeller 110 (FIGS. 3A-3C) is mounted to the propeller hub 190 such that rotation of the crank assembly 200 also rotates the propeller 110.

Each cylinder assembly 230a, 230b includes a cylinder 232 and a corresponding head 250. Each cylinder 232 is appropriately mounted to the crankcase 160. A gasket 256 may be disposed between its corresponding cylinder 232 and the crankcase 160. Similarly, a gasket 256 may be disposed between each head 250 and its corresponding cylinder 232. In some embodiments, the gasket between the cylinder 232 and the crankcase 160 may be different from the gasket between a head 250 and its corresponding cylinder 232. One or more spark plugs 252 (two in the illustrated embodiment) and a glow plug 254 may be installed on the head 250 for the case of each of the cylinder assemblies 230a, 230b.

Figure 6:
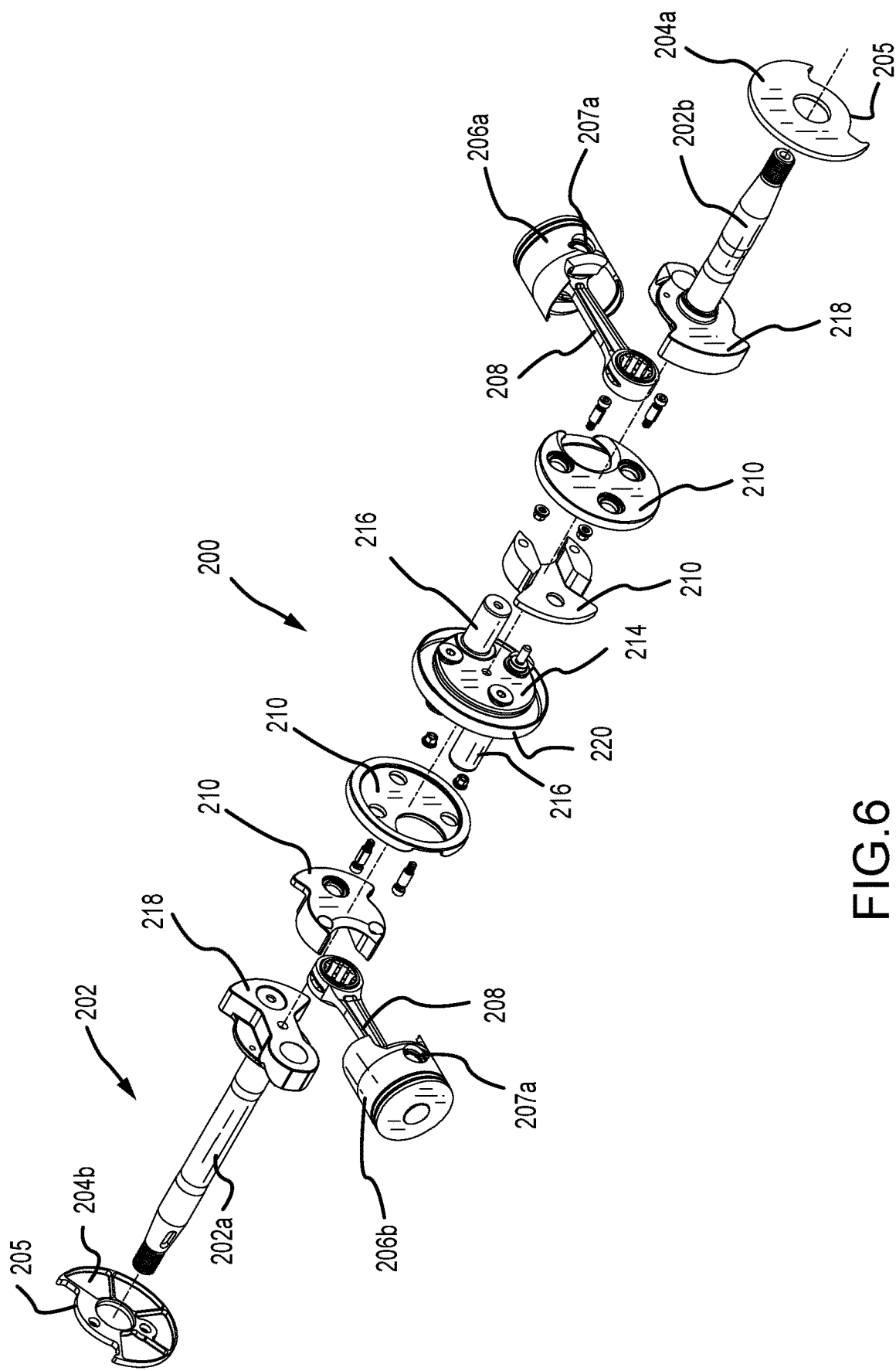
FIG. 6 is an exploded, perspective view of a crank assembly for the core assembly illustrated in FIG. 5.

FIG. 6 presents an exploded view of the crank assembly 200 and that includes a crankshaft 202. The crankshaft 202 includes a crankshaft section 202a to which the propeller hub 190 is mounted and on which the rotary valve 204b is mounted for rotation along with the crankshaft 202, along with a second crankshaft section 202b on which the rotary valve 204a is mounted for rotation along with the crankshaft 202. Each rotary valve 204a, 204b includes a cutout 205 for allowing a flow of air and/or an air/fuel to the corresponding cylinder assembly 230a, 230b. In some embodiments, the cutout of rotary valve 204a may differ from the cutout of rotary valve 204b. The crankshaft sections 202a and 202b are appropriately connected together so as to collectively rotate together. In some embodiments, the air fuel mixture may be preheated prior to being injected upstream of the rotary valve 204a, 204b. This may promote complete atomization and ignition of the air fuel mixture when it enters the combustion chamber 234a. Any suitable means of preheat may be used.

The crank assembly 200 further includes a center link 214, along with a number of stuffing bodies 210 and counterweights 218. The center link 214 includes a pair of crank pins 216 that project or extend in opposite directions from the main body (disc-shaped in the illustrated embodiment) of the center link 214. The piston 206a includes a piston or connecting rod 208 that is mounted on one of these crank pins 216, while the piston 206b includes a piston or connecting rod 208 that is mounted on the other of these crank pins 216. A wrist pin (e.g., wrist pin 207b in FIG. 11B) may be positioned within an aperture 207a that extends through the piston 206a, 206b, and may be used to interconnect the piston 206a, 206b with its corresponding piston or connecting rod 208.

A seal 220 is mounted on a perimeter surface of (and rotates with) the center link 214 and engages an interior of the crankcase 160 in one embodiment to separate the interior of the crankcase 160 into two separate chambers or compartments. These chambers/compartments are at least substantially fluidly isolated from one another. The seal 220 is formed from a different material than the crankcase 160 in this case. Relevant properties for the seal 220 in this case include without limitation, that the seal may be more compressible than the center link 214 and more compressible than the crankcase 160. In other words, the seal 220 may be compressed when installed onto the center link 214, and/or the seal 220 may be compressed when installed into the crankcase 160.

The seal 220 may comprise compressible and incompressible sections. In one embodiment, the seal 220 may be in the form of an annular structure having a pair of opposing cylindrical surfaces, wherein the innermost cylindrical surface may contact (press-fit or other appropriate coupling) to the center link 214 of the crankshaft 202, and the outermost cylindrical surface may contact (e.g., press-fit or other appropriate coupling method) to the crankcase 160. One non-limiting example of this embodiment may be a fluidically sealed bearing. In other embodiments, the seal 220 may comprise an annular structure with an incompressible inner cylindrical surface (such as a metal alloy) in contact with the center link 204 of the crankshaft 202 coupled to a compressible (e.g., flexible) outer annular portion that may contact or come close to contacting the crankcase 160. In this way, relative motion may be possible between the crankshaft 202 and the crankcase 160 while maintaining volumes that are substantially fluidly isolated. Alternately, the outer cylindrical surface of the seal 220 may be incompressible with a compressible inner annular portion adjacent the center link 214 of the crankshaft 202.

In some embodiments, the seal 220 may be in the form of an annular structure having a pair of opposing cylindrical surfaces, wherein the innermost cylindrical surface may contact the center link 214 of the crankshaft 202 while the outermost cylindrical surface may come close but not directly contact the crankcase 160, forming a gap between the center link 214 and the crankcase 160. The gap in this embodiment may be small enough to harbor a thin film of lubrication and prevent transfer of any substantial amount of crankcase gases or fluids through the gap. The gap may additionally be large enough to allow differential motion between the crankshaft 202 and the crankcase 160.

In other embodiments, the seal 220 may be in the form of a protrusion on the interior surface of the crankcase 160 that extends toward the center link 214 but does not contact the center link 214. Alternately, the seal 220 may be in the form of a protrusion on the outer annular surface of the center link 214 that extends toward the crankcase 160. In both of these examples, the seal 220 would prohibit any substantial fluidic communication between the side of the crankcase 160 fluidically coupled with cylinder assembly 230a (first compartment 166a of FIG. 7) and the side of the crankcase 160 fluidically coupled with cylinder assembly 230b (second compartment 166b of FIG. 7).

Representative materials for the seal 220 include without limitation rubber, silicone, PTFE, ceramic, nitrile, Viton, FEP, metal alloy, fluorocarbon, elastomeric materials. In embodiments that include the seal 220 being a protrusion from either the crankcase 160 or the center link 214, the seal 220 may be the same material as that from which it protrudes. In one nonlimiting example, if the seal 220 is in the form of a protrusion from the crankcase 160 and the crankcase 160 is constructed of an aluminum alloy casting, the seal 220 may also be constructed of the same aluminum alloy casting.

Benefits of a seal 220 that prevents substantial fluidic communication between compartments 166a and 166b may include, but are not limited to, being able to independently control the air/fuel combustion mixture delivered to each cylinder 232. In this way, problems associated with uneven and imbalanced combustion cycles that often occur with two-stroke engines with a shared crankcase may be mitigated. Atomization of the air/fuel mixture may also be maintained longer as a result of not being injected into the full volume of the crankcase 160.

Figure 7:
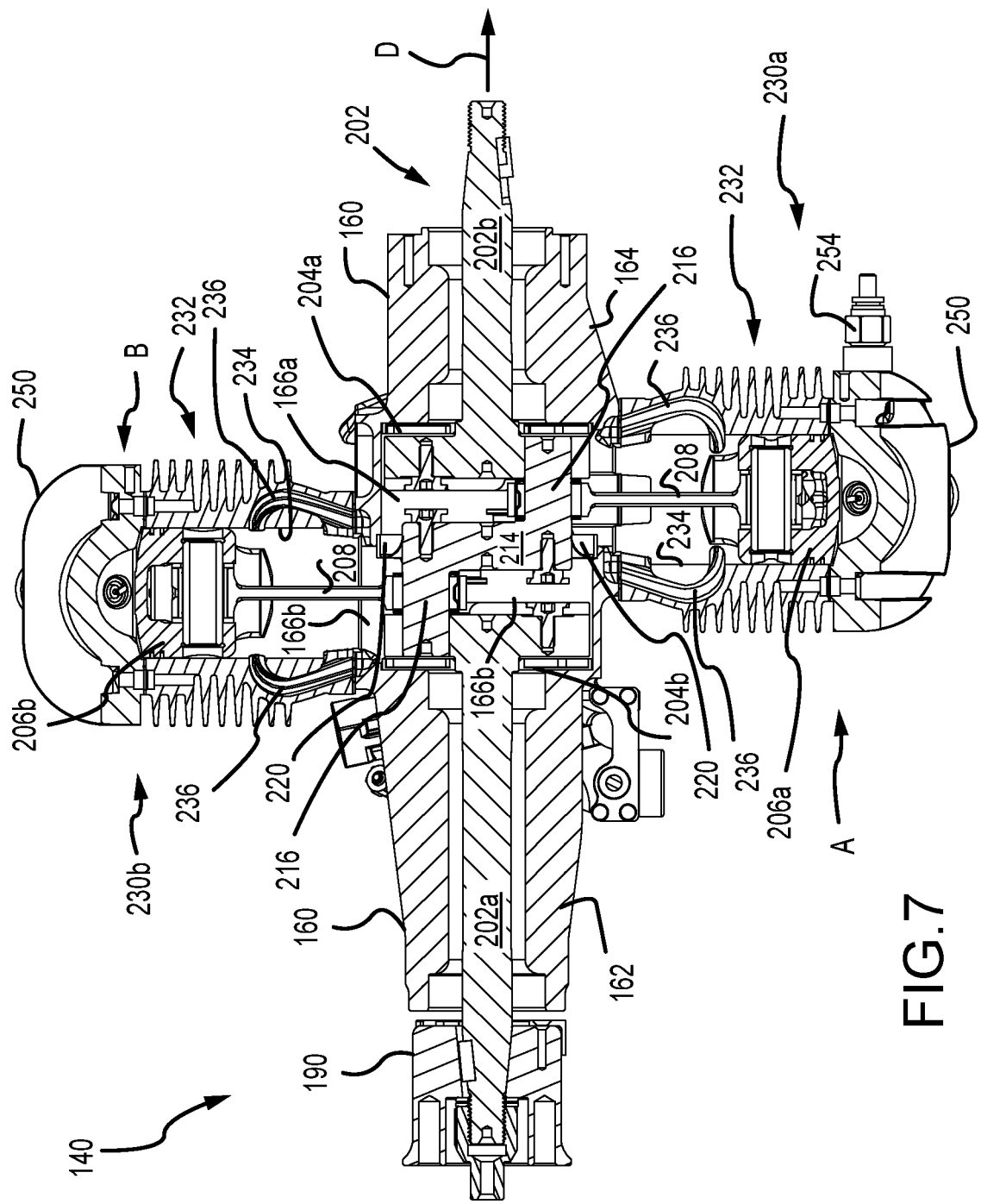
FIG. 7 is an assembled, cross-sectional view of the core assembly illustrated in FIG. 5.

FIG. 7 shows the core assembly 150 of FIG. 5 in an assembled configuration. Note that the cylinder assemblies 230a, 230b are offset from one another along the length dimension of the crankshaft 202. The cylinder assembly 230b (B side) is closer to the propeller hub 190 compared to the cylinder assembly 230a (A side), and measured along the length dimension of the crankshaft 202. However, each of the pistons 206a and 206b travel along an axial path within their respective cylinders 232 that are parallel to one another.

The noted engagement of the seal 220 (again, mounted on a perimeter (cylindrical in the illustrated embodiment) of the center link 214) with the interior of the crankcase 160 to define a first compartment 166a and a second compartment 166b is also depicted in FIG. 7. The first compartment 166a is associated with the cylinder assembly 230a and its piston 206a, while the second compartment 166b is associated with the cylinder assembly 230b and its associated piston 206b. Generally, air is directed into the first compartment 166a via a first air path, while air is directed into the second compartment 166b via a completely separate second air path. Air (and possibly fuel) within the first compartment 166a is primarily available for transfer to the cylinder assembly 230a (to the space between the piston 206a and the associated head 250—chamber 234a addressed below). Air (and possibly fuel) within the second compartment 166b is primarily available for transfer to the cylinder assembly 230b (to the space between the piston 206b and the associated head 250—its chamber 234a addressed below).

Figure 8A:
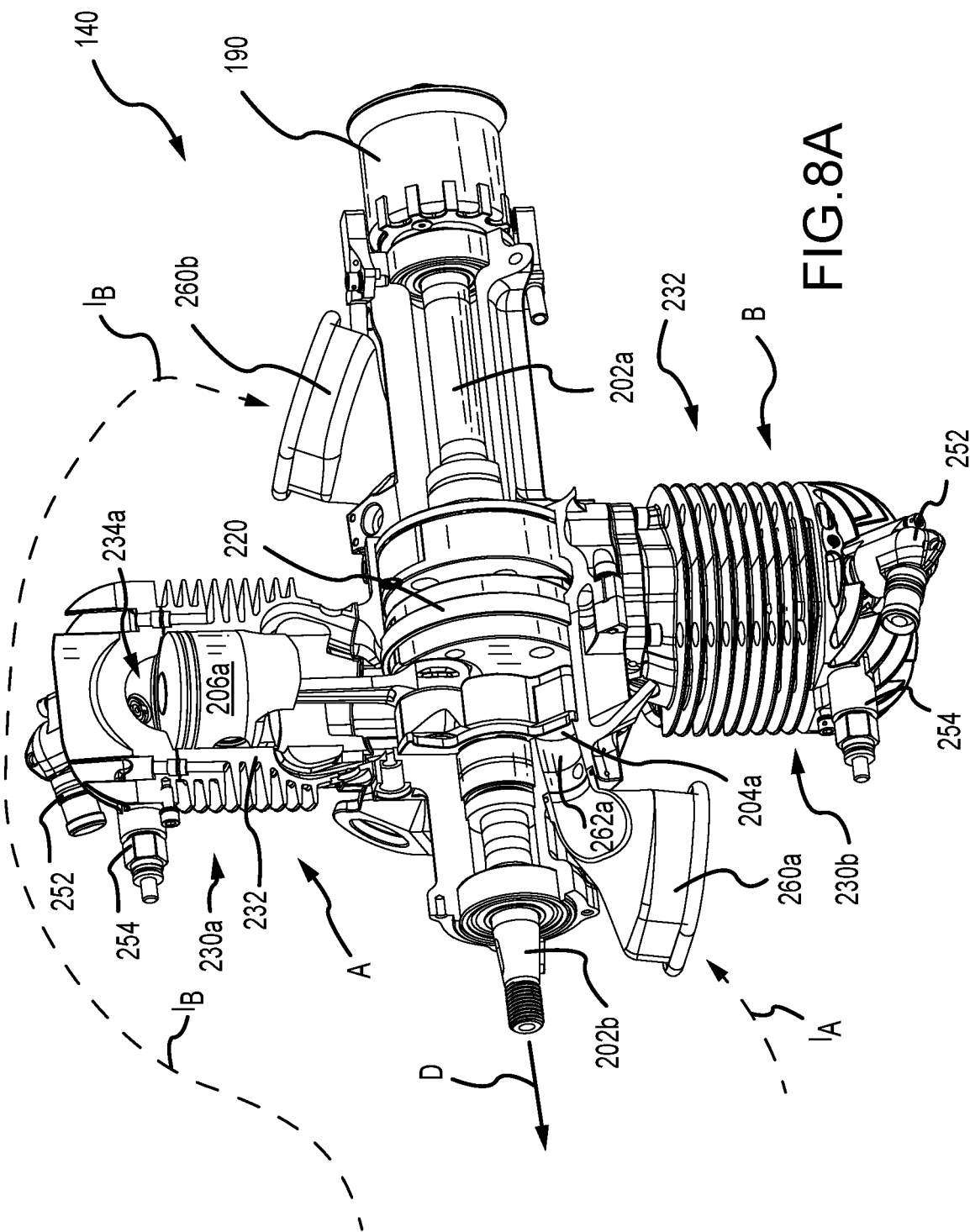
FIGS. 8A-8C are views that depict the position of two rotary valves of the engine for the propulsion system of the UAV of FIG. 3A, when the corresponding pistons are at top dead center.
Figure 8B:
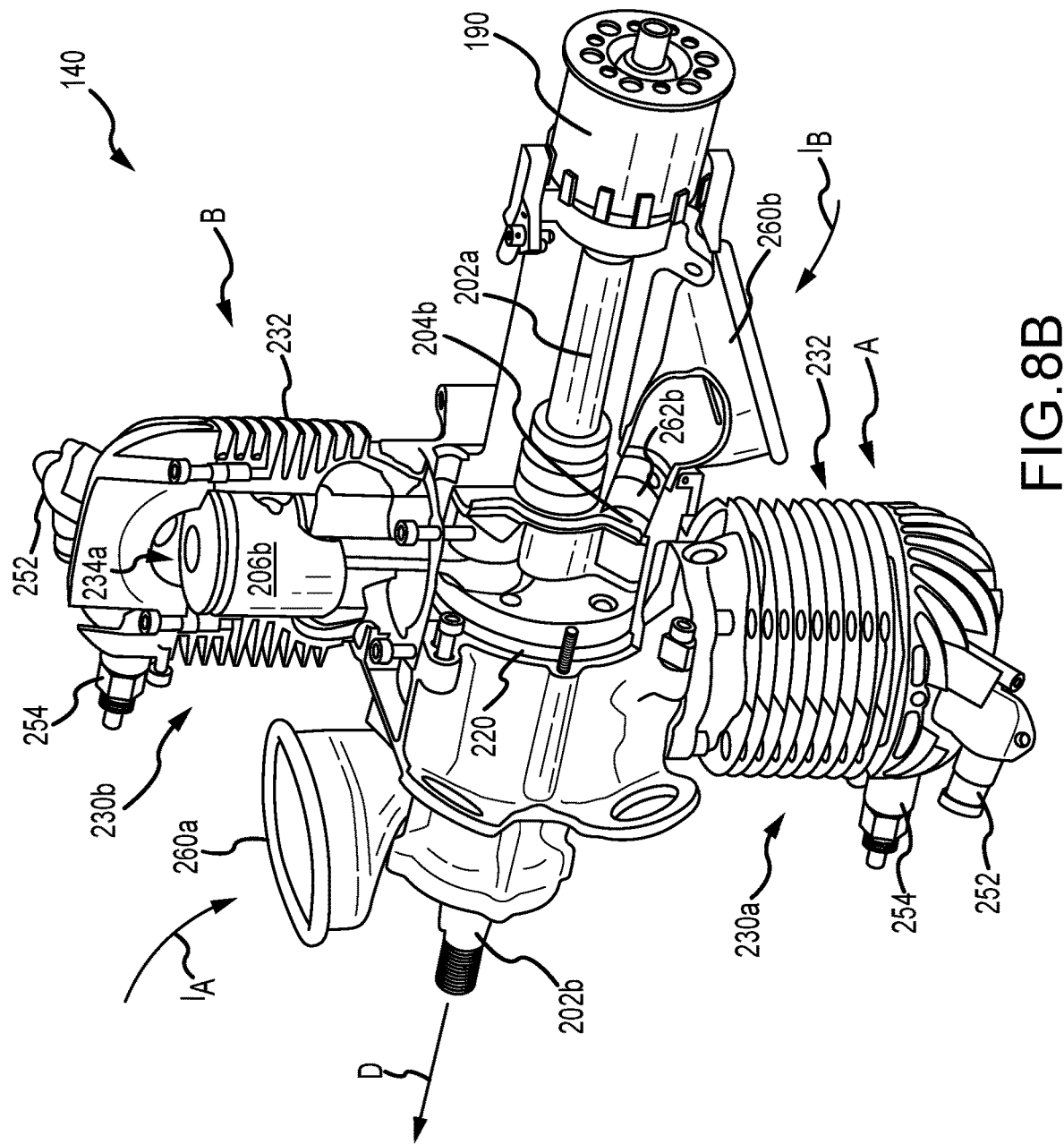
Figure 8C:
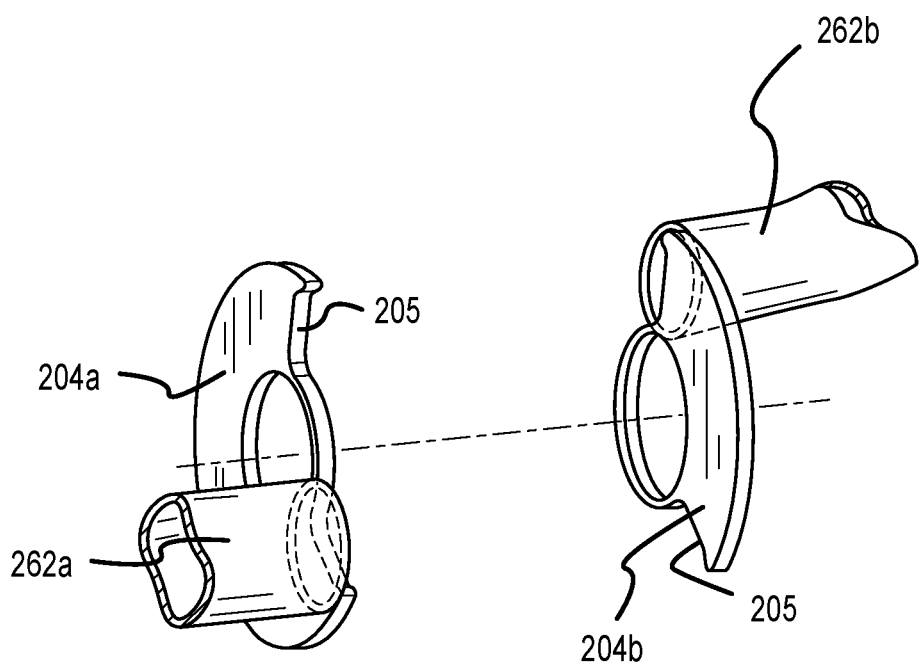

FIGS. 8A-8C show the piston 206a and piston 206b of the engine 140 both being at top dead center, and the position of their corresponding rotary valve 204a, 204b (note that the orientation of the engine 140 is inverted in FIG. 8B compared to FIG. 8A). The rotary valve 204a controls the airflow into the compartment 166a (within the crankcase 160 and separated from the compartment 166b by the seal 220 of the crank assembly 200) and that is used to provide air and/or an air/fuel mixture for the cylinder assembly 230a. Similarly, the rotary valve 204b controls the airflow into the compartment 166b (within the crankcase 160 and separated from the compartment 166a by the seal 220 of the crank assembly 200) and that is used to provide air and/or an air/fuel mixture for the cylinder assembly 230b. In this regard, the engine 140 further includes an air intake housing 260a (also shown in FIG. 3B) and an intake conduit 262a that connects the air intake housing 260a with the compartment 166a (within the crankcase 160), along with an air intake housing 260b and an intake conduit 262b that connects the air intake housing 260b with the compartment 166b (within the crankcase 160). As the UAV 80 is advanced in the direction of the arrow D, ambient air is directed into the air intake housing 260a (associated with cylinder assembly 230a) and as depicted by the arrow $I_A$ and ambient air is directed into the air intake housing 260b (associated with cylinder assembly 230b) and as depicted by the arrow $I_B$.

Note that the airflow $I_B$ (for cylinder assembly 230b) proceeds over the cylinder assembly 230a to reach the air intake housing 260b, while the airflow $I_A$ does not proceed over either of the cylinder assemblies 230a, 230b. That is, the air intake housings 260a, 260b may be characterized as being disposed on opposite sides or ends of the cylinder assembly 230a relative to the length dimension of the crankshaft 202.

There are further characterizations applicable to the air intake housings 260a, 260b. The opening to the air intake housing 260a projects at least generally downwardly in the view shown in FIG. 8A, while the opening to the air intake housing 260b projects at least generally upwardly in the view shown in FIG. 8A. The opening to the air intake housing 260a and the opening to the air intake housing 260b project in different directions. The opening to the air intake housing 260a and the opening to the air intake housing 260b project in opposite directions away from a reference plane that is both disposed between the cylinder assemblies 230a, 230b and orthogonal to the axes along with the pistons 206a, 206b reciprocate. The opening to the air intake housing 260a also projects to a small degree in the direction of travel D of the UAV 80, while the opening to the air intake housing 26b also projects to a small degree away from the direction of travel D of the UAV 80.

As shown in FIGS. 8A-8C, the rotary valves 204a, 204b are partially open when their corresponding pistons 206a, 206b are at top dead center or TDC (and the pistons 206a, 206b are also at their respective top dead center positions or TDC at the same time). That is, the cutout 205 of the rotary valve 204a is partially aligned with the flowpath through the intake conduit 262a in the configuration of FIGS. 8A-8C, while the cutout 205 of the rotary valve 204b is partially aligned with flowpath through the intake conduit 262b in the configuration of FIGS. 8A-8C. The rotary valves 204a, 204b are in the fully open position (no portion of the valves 204a, 204 block flow through their corresponding intake conduit 262a, 262b) as their respective pistons 206a, 206b are traveling toward, but prior to reaching TDC. When the rotary valves 204a, 204b are at least partially open (at least part of the cutout 250 is at least partially aligned with the corresponding intake conduit 262a, 262b), ambient air can be directed through the air intake housing 260a and intake conduit 262a and into the compartment 166a (within the crankcase 160 and separated from the compartment 166b by the seal 220 of the crank assembly 200), while ambient air can be directed through the air intake housing 260b and intake conduit 262b and into the compartment 166b (within the crankcase 160 and separated from the compartment 166a by the seal 220 of the crank assembly 200).

Figure 9A:
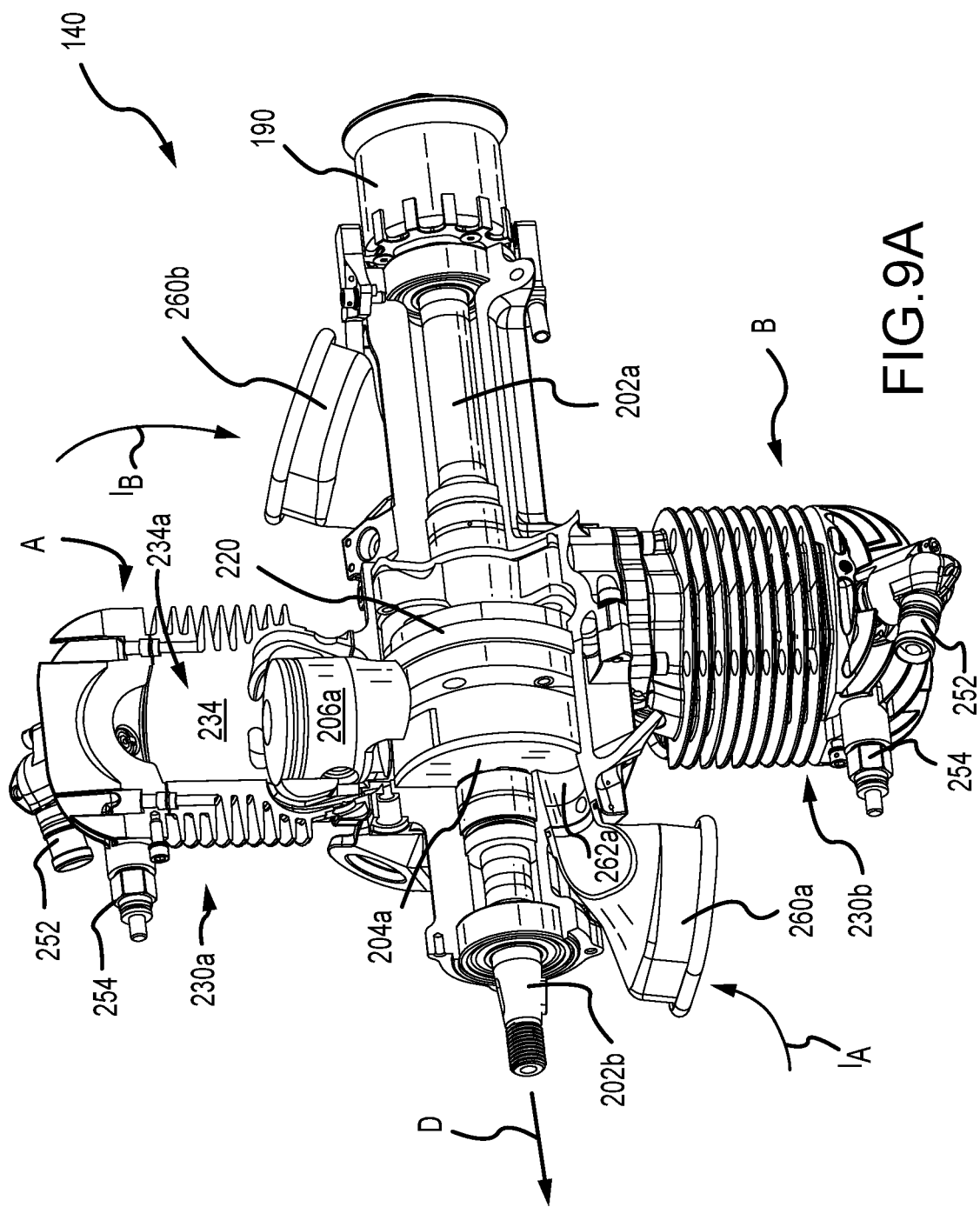
FIGS. 9A-9C are views that depict the position of the two rotary valves of the engine for the propulsion system of the UAV of FIG. 3A, when the corresponding pistons are at bottom dead center.
Figure 9B:
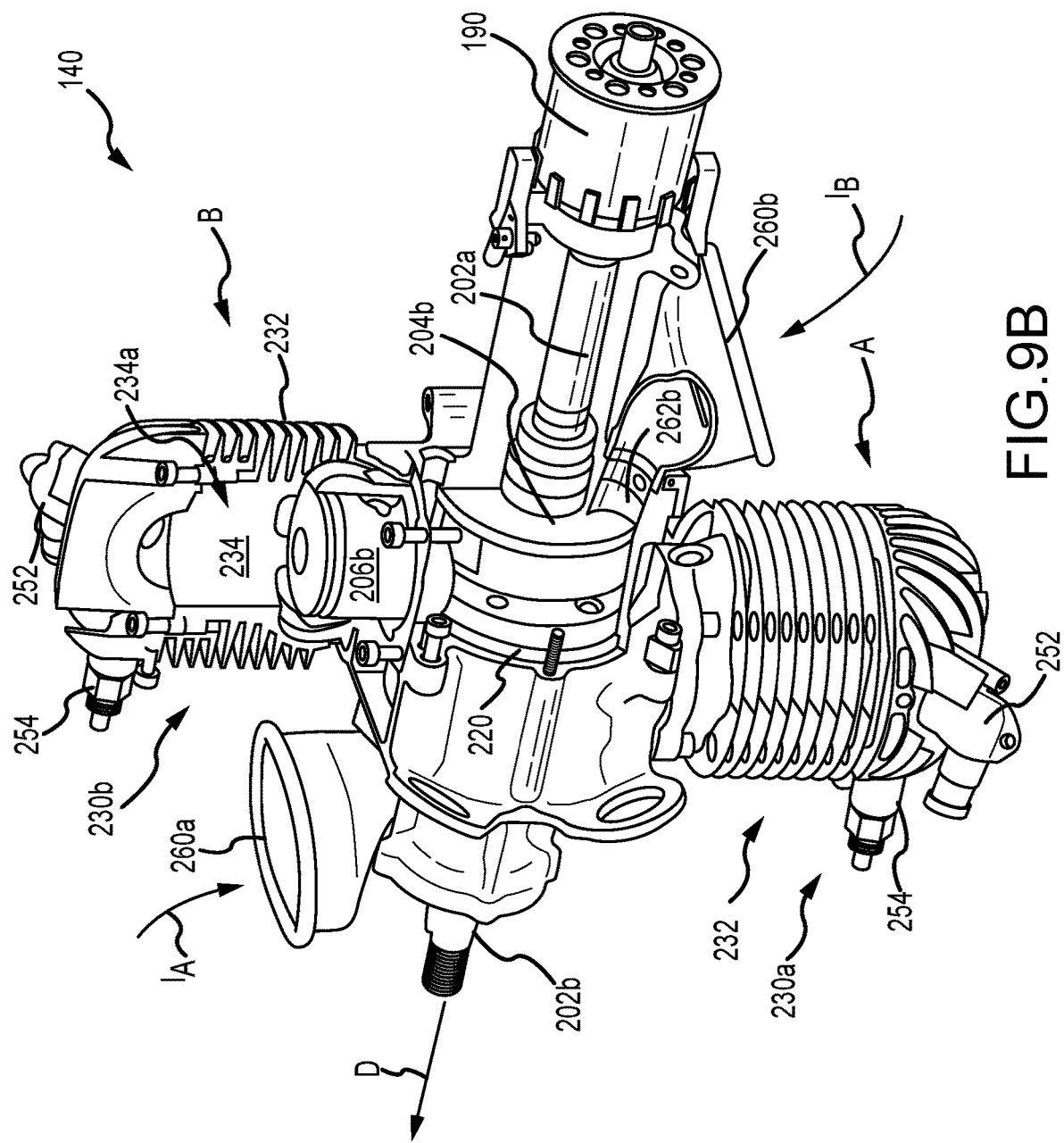
Figure 9C:
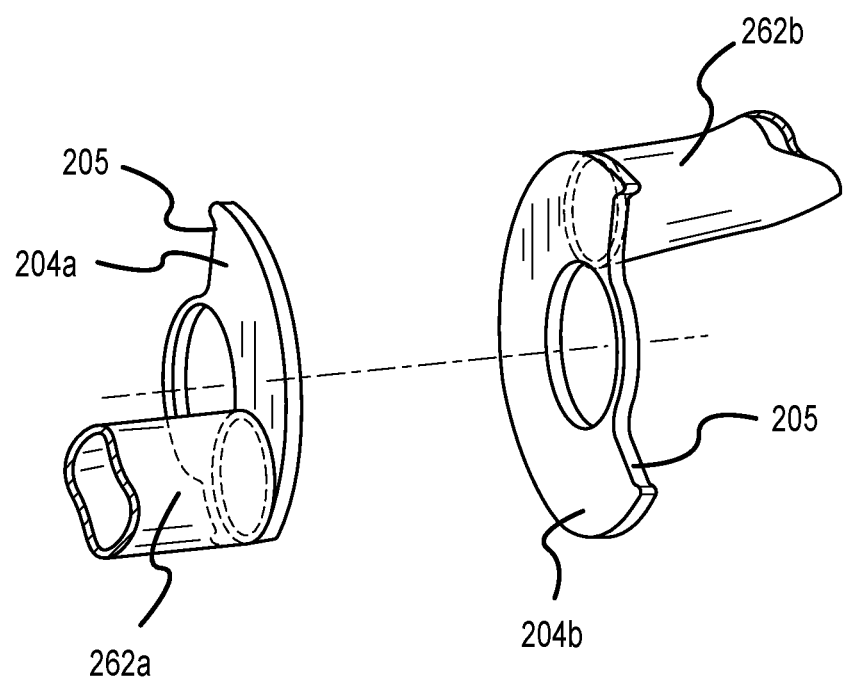

FIGS. 9A-9C show the piston 206a and piston 206b of the engine 140 both being at BDC, and the position of their corresponding rotary valve 204a, 204b (note that the orientation of the engine 140 is inverted in FIG. 9B compared to FIG. 9A). As shown in FIGS. 9A-9C, the rotary valves 204a, 204b are fully closed when their corresponding pistons 206a, 206b are at BDC (the rotary valves 204a, 204b block flow through their corresponding intake conduit 262a, 262b). That is, at this time, the cutout 205 of the rotary valve 204a is fully misaligned with the flowpath through the intake conduit 262a, while the cutout 205 of the rotary valve 204b is fully misaligned with the flowpath through the intake conduit 262b. This precludes airflow into the compartments 166a, 166b through the corresponding air intake housing 260a/intake conduit 262a and air intake housing 260b/intake conduit 262b.

FIGS. 10A-10E present various views of one of the cylinders 232 used by engine 140 (e.g., FIGS. 3A-3C; the two cylinders 32 being of a common configuration). In other embodiments, the cylinders 232 may differ. Each cylinder 232 includes a cylindrical inner wall 234 along which its corresponding piston 206a, 206b reciprocates. The space that is collectively defined by cylindrical inner wall 234, the end face of the corresponding piston 206a, 206b, and the corresponding head 250 defines a chamber 234a (e.g., combustion chamber 234a) that is of variable volume (based upon movement of the piston 206a, 206b relative to the corresponding cylinder 232). FIGS. 10A-10E address how air or an air/fuel mixture is directed into the chamber 234a of the associated cylinder 232, as well as how exhaust gases are discharged from this chamber 234a.

Figure 10A:
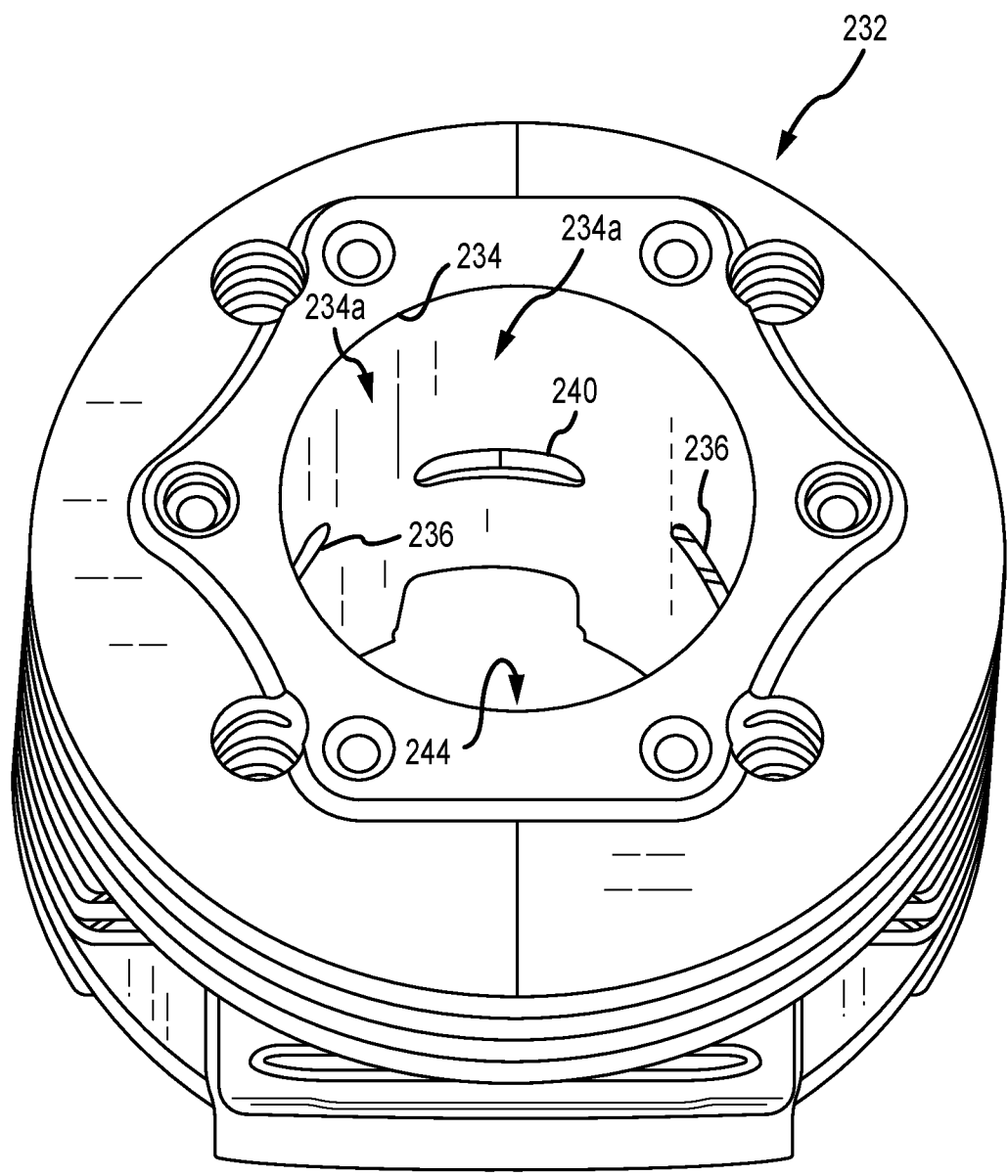
FIG. 10A is a perspective view of one of the cylinders of the engine for the propulsion system of the UAV of FIG. 3A, and illustrating a pair of intake/transfer ports and a boost port for directing air and/or an air/fuel mixture into the cylinder.
Figure 10B:
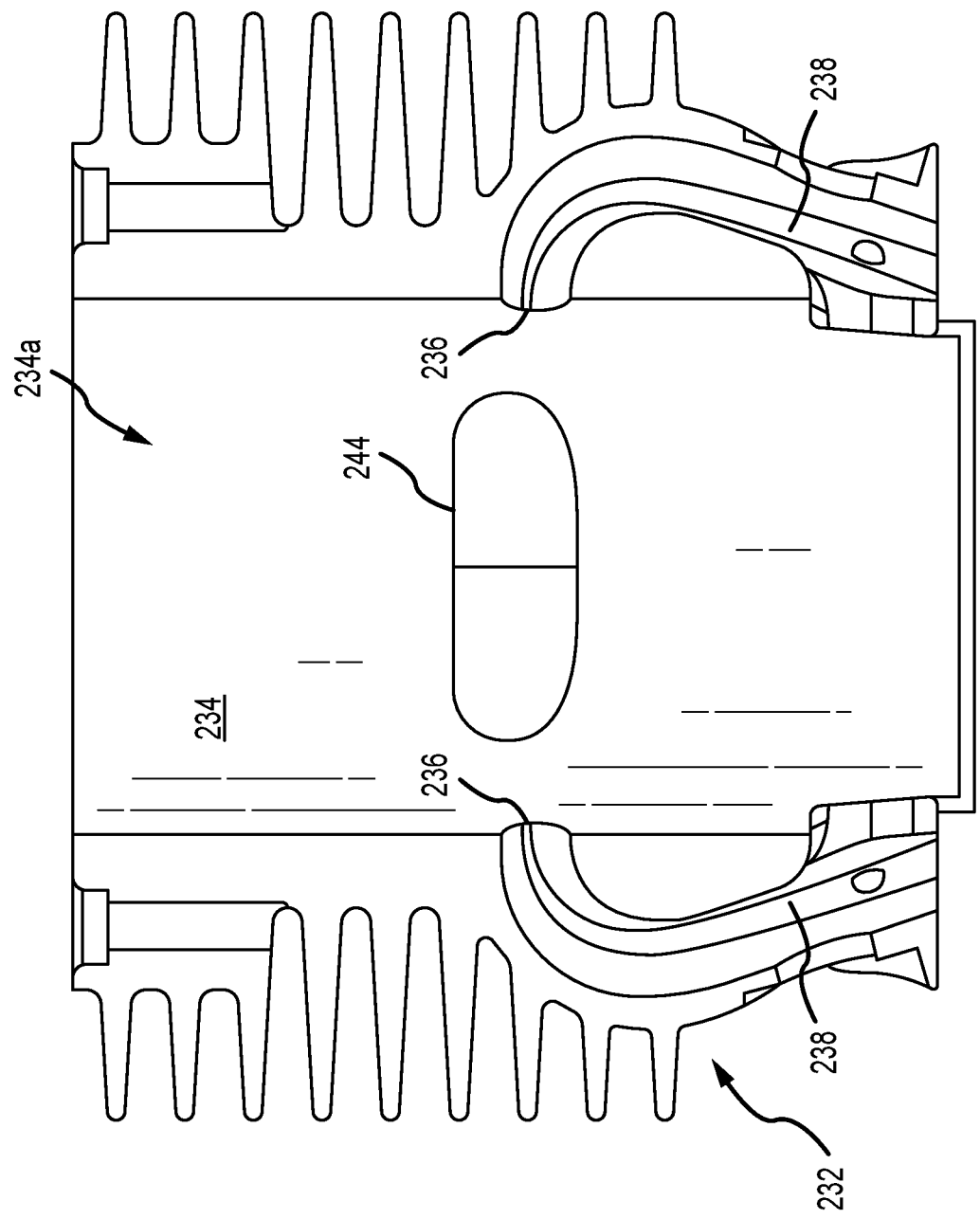
FIG. 10B is a view of the cylinder of FIG. 10A, and illustrating an exhaust port and the pair of transfer ports.
Figure 10C:
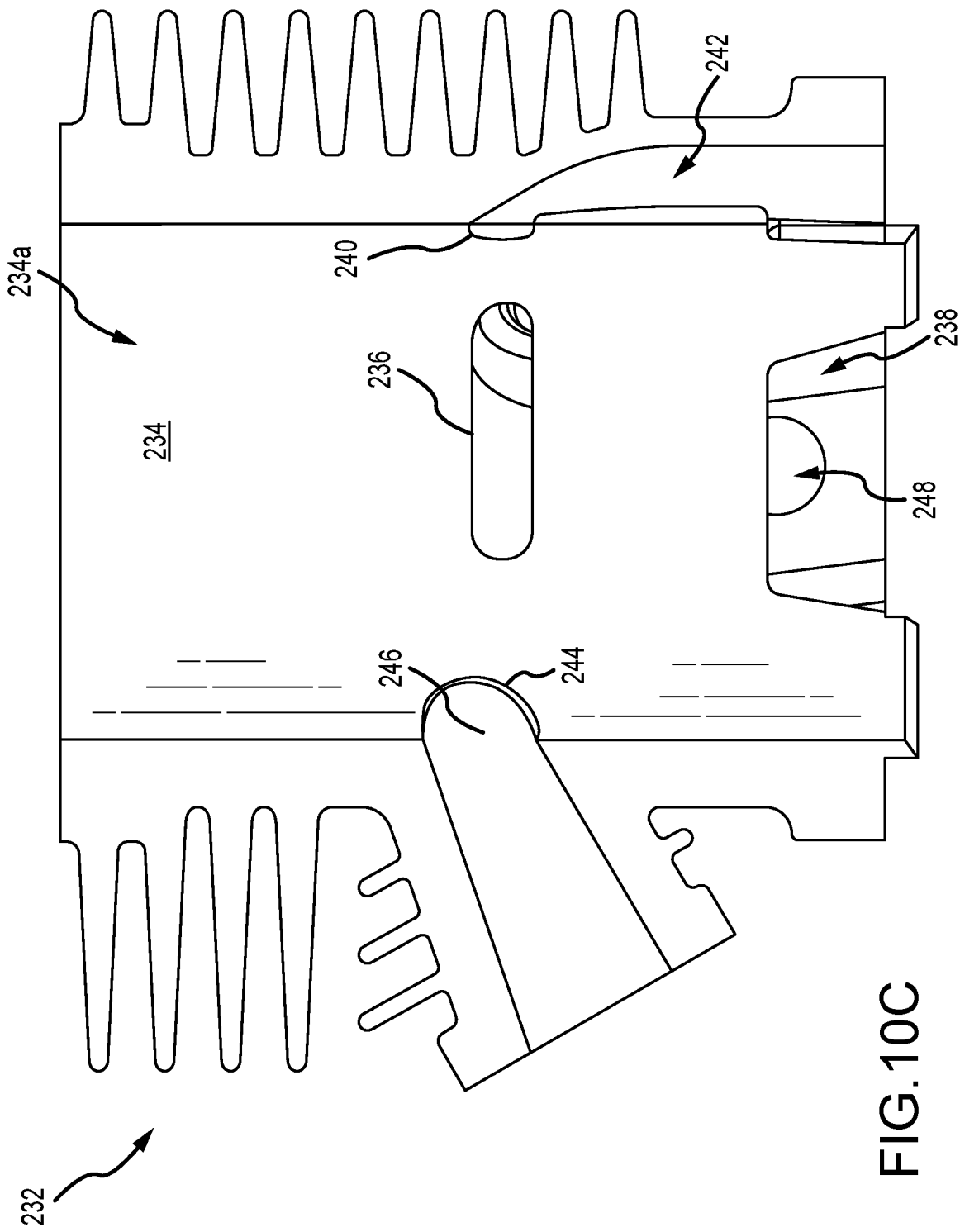
FIG. 10C is a view of the cylinder of FIG. 10A, and illustrating one transfer port, the boost port, and the exhaust port, along with a fuel injection port.
Figure 10D:
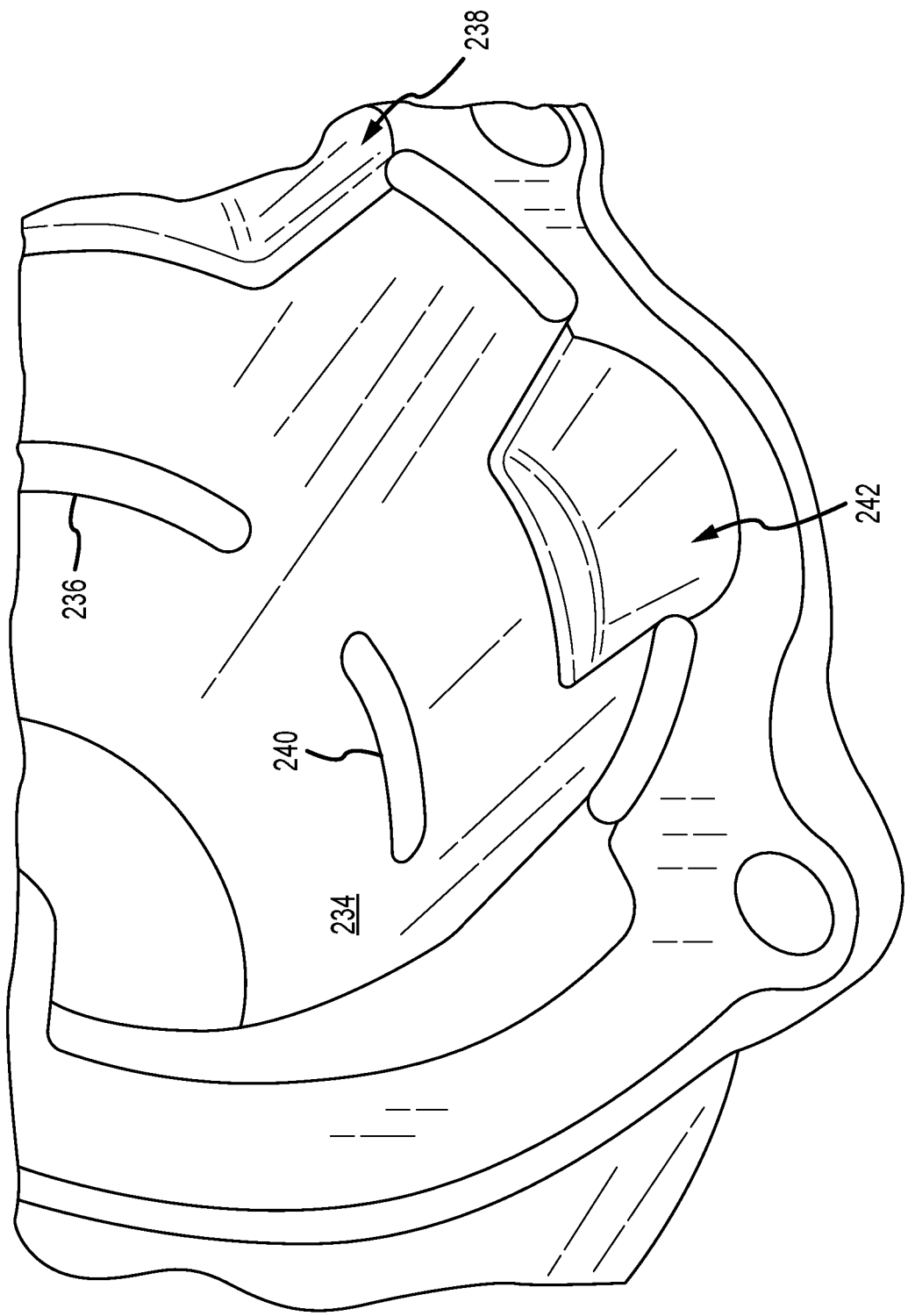
FIG. 10D is another view of the cylinder of FIG. 10A, and illustrating the internal passage through the cylinder for the boost port.

There are three ports per cylinder 232 that are fluidly interconnected with the corresponding compartment 166a, 166b of the crankcase 160—a pair of transfer ports 236 (intake) and a boost port 240 (note that FIG. 10A shows the end of the cylinder 232 on which its head 250 is mounted). The pair of transfer ports 236 intersect the cylindrical inner wall 234 of the cylinder 232 at locations that are directly opposite of one another (e.g., the intersection of the transfer ports 236 with the inner wall 234 are spaced 180° apart proceeding about the cylindrical inner wall 234). The transfer ports 236 extend through the body of the cylinder 232 along what may be referred to as an internal passage 238. A fuel injector 182 may be integrated to inject fuel directly into one of these transfer ports 236 or at the base of the corresponding cylinder 232.

The boost port 240 intersects the cylindrical inner wall 234 of the cylinder 232 midway between where the transfer ports 236 intersect the cylindrical inner wall 234 (proceeding about the cylindrical the inner wall 234; e.g., the intersection of the boost port 240 with the cylindrical inner wall 234 is spaced 90° from where each of where the transfer ports 236 intersect the cylindrical inner wall 234 proceeding about the cylindrical inner wall 234). The boost port 240 extends through the body of the cylinder 232 along what may be referred to as an internal passage 242. The boost port 240 may be angled high (e.g., in the direction of the corresponding head 250) to assist in scavenging exhaust gases from the chamber 234a.

The exhaust port 244 intersects the inner wall 234 of the cylinder 232 at a location that is directly opposite of where the boost port 240 intersects the inner wall 234 (e.g., the intersection of the boost port 240 and exhaust port 244 with the cylindrical inner wall 234 are spaced 180° apart proceeding about the cylindrical inner wall 234). Exhaust gases are directed out of the exhaust port 244, through an exhaust passage 246, to the exhaust header 272 for the cylinder 232, and to the associated muffler 270.

Figure 10E:
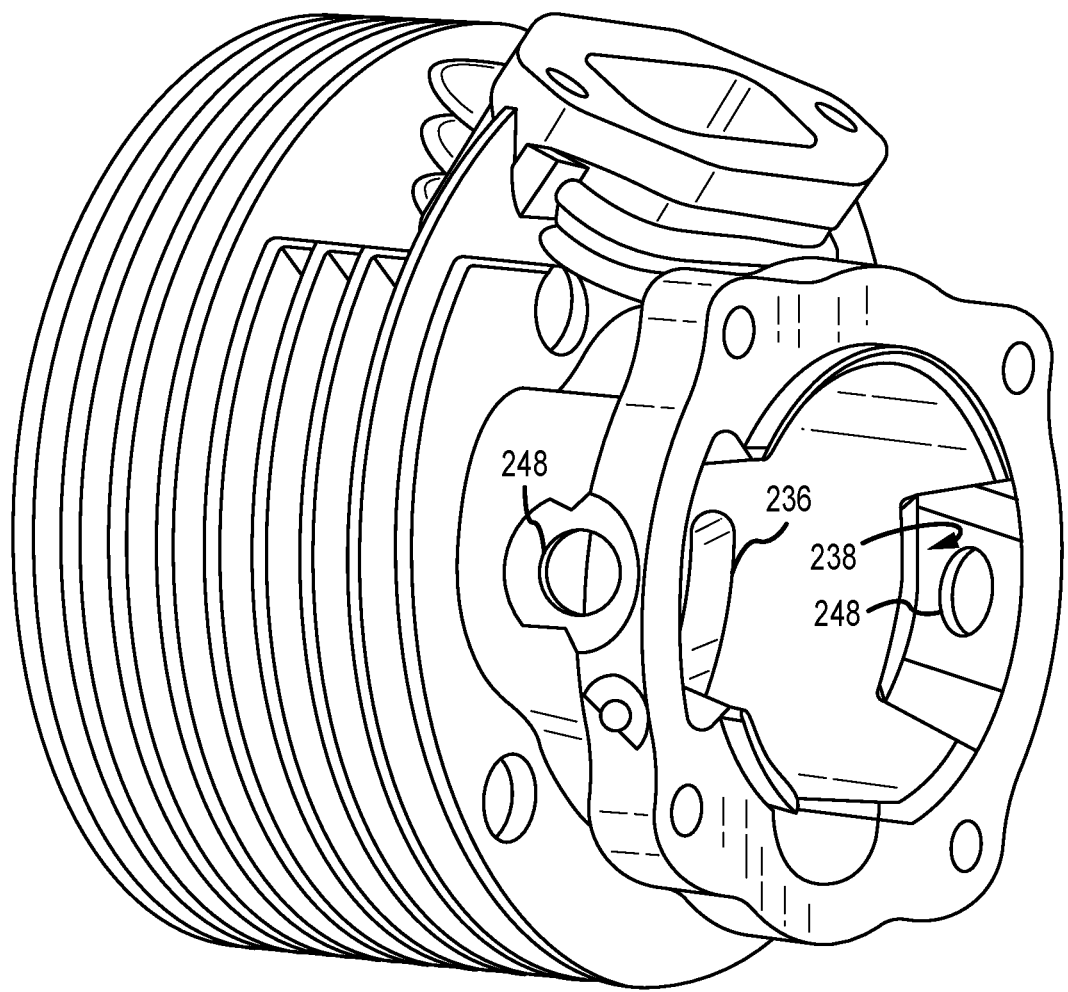
FIG. 10E is a perspective view of the cylinder of FIG. 10A, and illustrating a pair of fuel injector ports.

FIG. 10E shows the end of cylinder 232 that attaches to the crankcase 160. A pair of fuel injector ports 248 extend through the body of the cylinder 232. Each fuel injector port 248 intersects with the internal passage 238 of one of the transfer ports 236. If only a single fuel injector 182 is used, the un-used fuel injector port 248 would typically be plugged.

The illustrated engine 140 (e.g., FIGS. 3A-3C, 7, 8A, 8B, 9A, 9B) is of a two-cycle configuration. One is a combined intake/compression cycle or stroke, and the other is a combined expansion/exhaust cycle or stroke. Movement of a piston 206a, 206b in its corresponding cylinder 232, and toward TDC, results in air and/or an air/fuel mixture being directed into the corresponding chamber 234a draws new air and/or an air/fuel mixture into the corresponding compartment 166a, 166b of the crankcase 160 (by the corresponding rotary valve 204a, 204b being at least partially open), and compresses the air/fuel mixture that is within the chamber 234a (an intake/compression stroke). Actuation of the corresponding spark plug(s) 252 typically occurs when the corresponding piston 206a, 206b is at or near TDC. This ignites the air/fuel mixture within the chamber 234a and initiates the expansion/exhaust stroke (moves the piston 206a, 206b toward BDC). As the piston 206a, 206b moves from TDC toward BDC: 1) exhaust gases are directed out of the exhaust port 244 (after the piston 206a, 206b passes the corresponding exhaust port 244 to expose the same to the chamber 234a); 2) the corresponding rotary valve 204a, 204b will at some point in time close such that further movement of the corresponding piston 206a, 206b toward BDC will compress the air and/or air/fuel mixture within the corresponding compartment 166a, 166b of the crankcase 160; and 3) when the piston 206a, 206b moves past the boost port 240 and transfer ports 238 (so they are now exposed to the chamber 234a), air and/or an air/fuel mixture from the corresponding compartment 166a, 166b of the crankcase 160 will be forced through each of ports 236, 240 (by the previous pressurization of the corresponding compartment 166a, 166b) to introduce a new air/fuel mixture into the chamber 234a and which will also assist in directing exhaust gases out of the chamber 234a. The two noted cycles thereafter repeat in accordance with the foregoing.

Figure 11A:
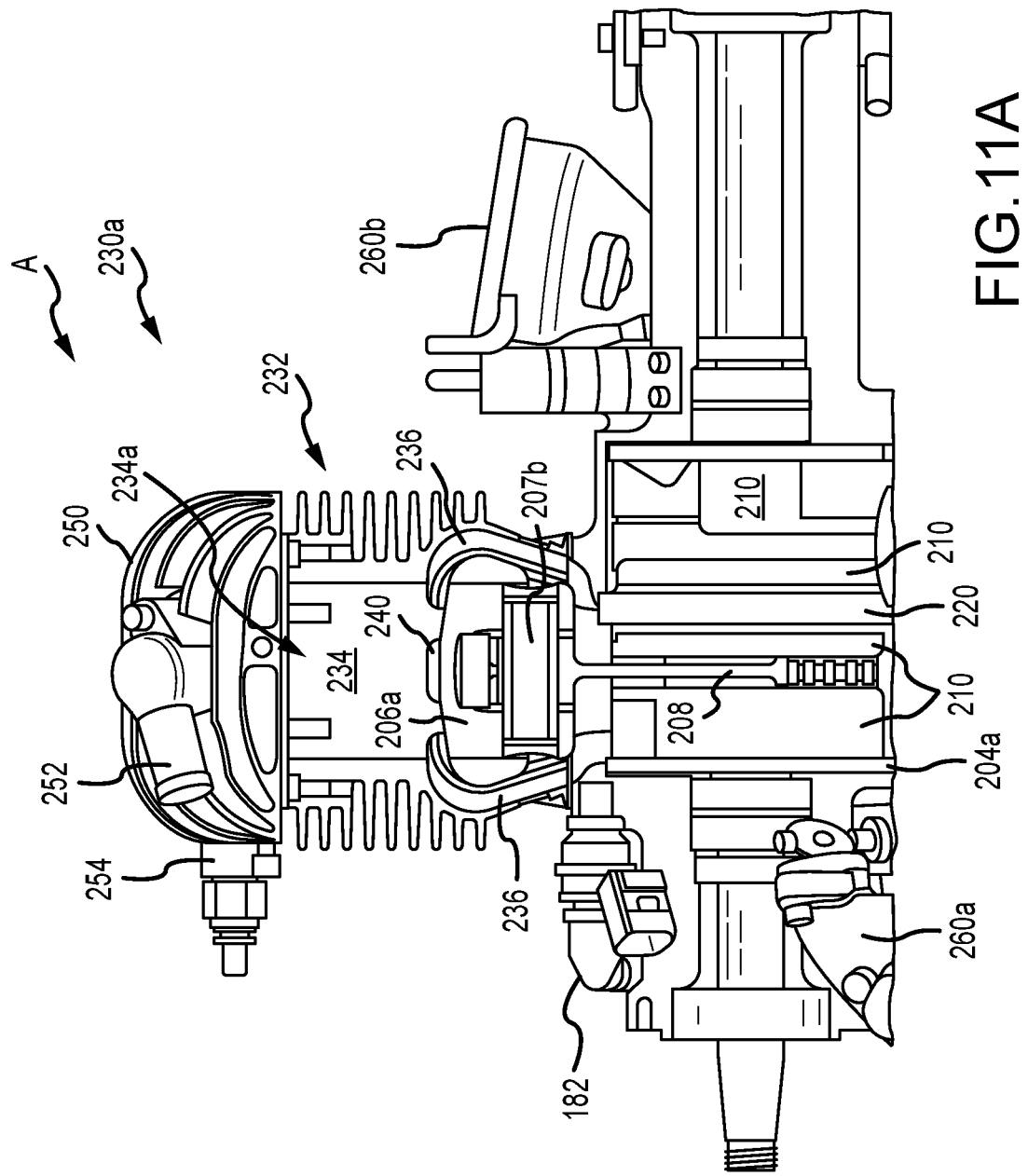
FIG. 11A is a view of a portion of the engine for the propulsion system of the UAV of FIG. 3A, and illustrating one integration of a fuel injector for the illustrated cylinder.

FIG. 11A illustrates a configuration where a fuel injector 182 is integrated by the engine 140 so as to inject fuel directly into one of the two noted transfer ports 236 for the cylinder assembly 230a. At least some of the fuel will be entrained within air that is flowing from the corresponding compartment 166a of the crankcase 160 and into this transfer port 236 (and thereby will be directed into the chamber 234a through this transfer port 236 in the above-noted manner). However, some of this fuel may enter the corresponding compartment 166a of the crankcase 160 and become entrained in an airflow through the other of the transfer ports 236 and/or the boost port 240 and thus may also be directed into the chamber 234a for the cylinder assembly 230a in the above-noted manner. This same configuration/principles may be applied to the cylinder assembly 230b and in relation to its corresponding crankcase compartment 166b.

Figure 11B:
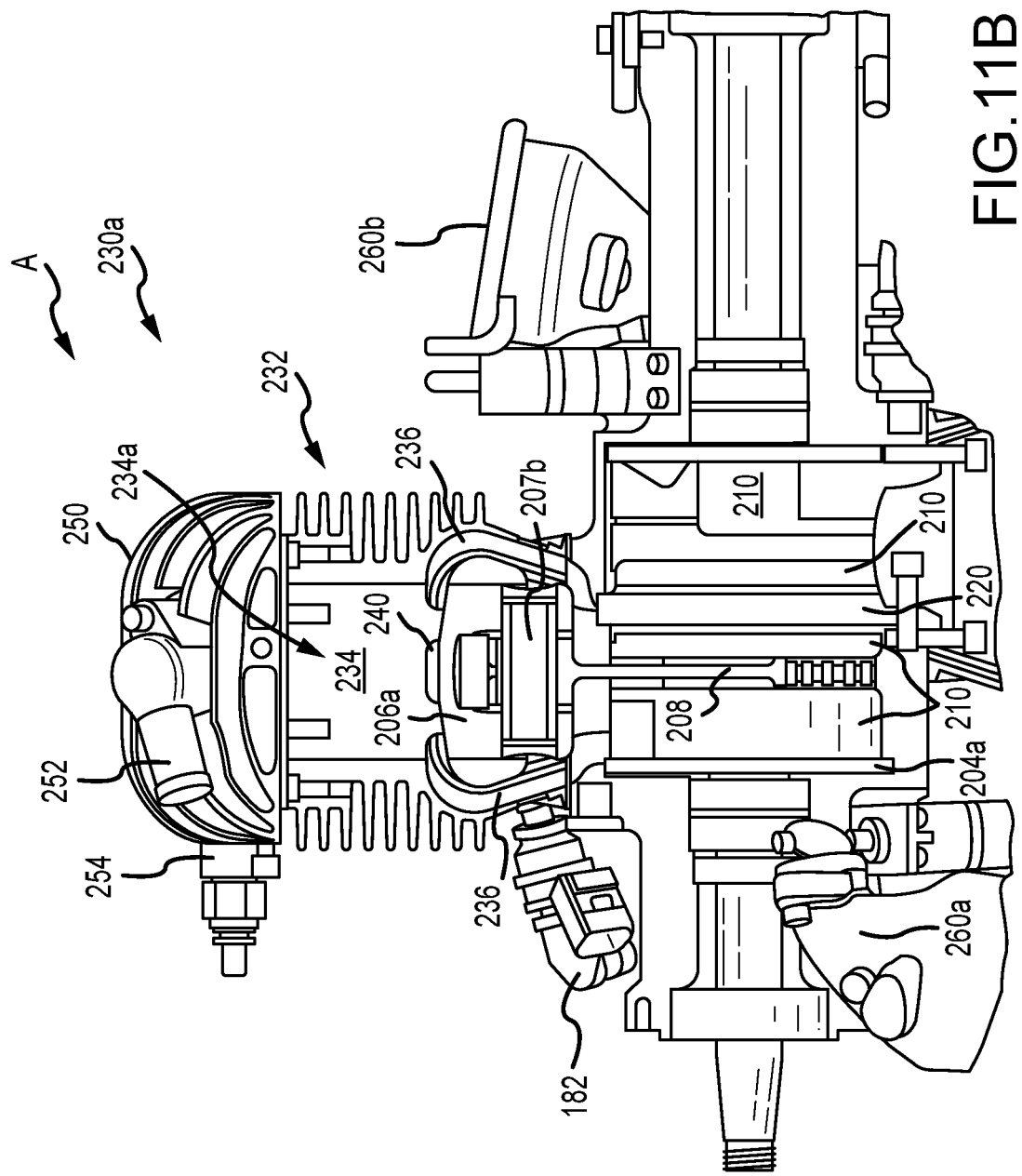
FIG. 11B is a view of a portion of the engine for the propulsion system of the UAV of FIG. 3A, and illustrating another integration of a fuel injector for the illustrated cylinder.

FIG. 11B illustrates a configuration where a fuel injector 182 is integrated by the engine 140 so as to inject fuel directly through one of the two noted transfer ports 236, into an interior passage that extends through a wrist pin 207b of the corresponding piston 206a, and into the oppositely disposed transfer port 236 for the cylinder assembly 230a. A substantial port of the fuel from the fuel injector 182 should be directed into the transfer port 236 that is disposed on the opposite side of the cylinder 232, and will then be entrained within air that is flowing from the corresponding compartment 166a of the crankcase 160 and into this transfer port 236 for transport into the chamber 234a for the cylinder assembly 230a in the above-noted manner. However, some of the fuel from the fuel injector 182 could remain in the transfer port 236 that is on the same side of the cylinder 232 as the fuel injector 182, and will then become entrained in an airflow through this transfer port 236 for transport into the chamber 234a for the cylinder assembly 230a in the above-noted manner. Some of the fuel from the fuel injector 182 may enter the corresponding compartment 166a of the crankcase 160 and become entrained in an airflow through one or more of the transfer ports 236 and/or the boost port 240 and thus may also be directed into the chamber 234a for the cylinder assembly 230a in the above-noted manner. This same configuration/principles may be applied to the cylinder assembly 230b and in relation to its corresponding crankcase compartment 166b. A potential benefit of the arrangement shown in FIG. 11B includes without limitation the ability to direct injected fuel mixture to both transfer ports 236, while minimizing loss of fuel atomization that may occur if the injected fuel mixture is permitted to enter the full internal volume of the crankcase 160.

In other embodiments (not shown), the fuel injector 182 may be positioned in an intake conduit 262a, 262b positioned upstream of the rotary valve 204a, 204b. In this way, the injected fuel may mix with incoming fresh air passing through the intake conduit 262a, 262b and the mixture would then enter through the rotary valve 204a, 204b into the respective compartment 166a, 166b. In some embodiments, the engine 140 may include a method of heating the injected air/fuel mixture upstream of the rotary valves 204a, 204b to promote atomization and increase combustion efficiency.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. An Unmanned aerial vehicles (UAV) propulsion system, comprising:
    a crankcase comprising a first crankcase compartment and a separate second crankcase compartment;
    a rotatable crankshaft;
    a first cylinder assembly;
    a first piston interconnected with said crankshaft, disposed within said first cylinder assembly, and reciprocable relative to said first cylinder assembly to rotate said crankshaft, wherein said first cylinder assembly and said first piston collectively define a first chamber;
    at least one first port extending from said first crankcase compartment to said first chamber;
    a second cylinder assembly;
    a second piston interconnected with said crankshaft, disposed within said second cylinder assembly, and reciprocable relative to said second cylinder assembly to rotate said crankshaft, wherein said second cylinder assembly and said second piston collectively define a second chamber;
    at least one second port extending from said second crankcase compartment to said second chamber;
    a first airflow path extending from an exterior of said UAV propulsion system to said first crankcase compartment;
    a second airflow path extending from said exterior of said UAV propulsion system to said second crankcase compartment, wherein said first airflow path is completely separate from said second airflow path; and
    a propeller hub mounted to said crankshaft and adapted to receive a propeller.

2. The UAV propulsion system of claim 1, wherein said first crankcase compartment is at least substantially fluidly isolated from said second crankcase compartment.

3. The UAV propulsion system of claim 1, wherein said first crankcase compartment is dedicated to said first chamber collectively defined by said first cylinder assembly and said first piston, and wherein said second crankcase compartment is dedicated to said second chamber collectively defined by said second cylinder assembly and said second piston.

4. The UAV propulsion system of claim 1, further comprising a first disc that rotates with said crankshaft and an annular seal disposed on a perimeter of said first disc, wherein said first crankcase compartment is disposed on a first side of said seal and said second crankcase compartment is disposed on an opposite, second side of said seal, wherein said seal interfaces with an interior surface of said crankcase.

5. The UAV propulsion system of claim 4, wherein said first disc comprises first and second crankpins that extend in opposite directions, wherein said first crankpin is mounted to a connecting rod for said first piston, and wherein said second crankpin is mounted to a separate connecting rod for said second piston.

6. The UAV propulsion system of claim 1, further comprising an annular seal disposed between said first crankcase compartment and said second crankcase compartment.

7. The UAV propulsion system of claim 1, further comprising a first fuel injector mounted to a base of said first cylinder assembly and a second fuel injector mounted to a base of said second cylinder assembly, wherein said first and second fuel injectors inject a heavy fuel for said first and second chambers, respectively.

8. The UAV propulsion system of claim 1, wherein said at least one first port comprises a plurality of first transfer ports, wherein said at least one second port comprises a plurality second transfer ports, said UAV propulsion system further comprising a first fuel injector and a second fuel injector, wherein said first fuel injector injects fuel directly into one of said first transfer ports that is on a same side of said first cylinder assembly as said first fuel injector, and wherein said second fuel injector injects fuel directly into one of said second transfer ports that is on a same side of said second cylinder assembly as said second fuel injector.

9. The UAV propulsion system of claim 1, wherein said at least one first port comprises a plurality of first transfer ports, wherein said at least one second port comprises a plurality second transfer ports, said UAV propulsion system further comprising a first fuel injector and a second fuel injector, wherein said first fuel injector injects fuel into one of said first transfer ports that is on an opposite side of said first cylinder assembly compared to said first fuel injector, and wherein said second fuel injector injects fuel into one of said second transfer ports that is on an opposite side of said second cylinder assembly compared to said second fuel injector.

10. The UAV propulsion system of claim 1, wherein said at least one first port comprises a pair of first transfer ports that are oppositely disposed and a first boost port, and wherein said at least one second port comprises a pair of second transfer ports that are oppositely disposed and a second boost port.

11. The UAV propulsion system of claim 10, further comprising a first fuel injector and a second fuel injector, wherein said first fuel injector injects fuel directly into one of said first transfer ports that is on a same side of said first cylinder assembly as said first fuel injector, and wherein said second fuel injector injects fuel directly into one of said second transfer ports that is on a same side of said second cylinder assembly as said second fuel injector.

12. The UAV propulsion system of claim 10, further comprising a first fuel injector and a second fuel injector, wherein said first fuel injector injects fuel into one of said first transfer ports that is on an opposite side of said first cylinder assembly compared to said first fuel injector, and wherein said second fuel injector injects fuel into one of said second transfer ports that is on an opposite side of said second cylinder assembly compared to said second fuel injector.

13. The UAV propulsion system of claim 10, wherein said first fuel injector injects said fuel through said first piston and then into said one of said first transfer ports that is on said opposite side of said first cylinder assembly compared to said first fuel injector, and wherein said second fuel injector injects said fuel through said second piston and then into said one of said second transfer ports that is on said opposite side of said second cylinder assembly compared to said second fuel injector.

14. The UAV propulsion system of claim 1, further comprising a first rotary valve and a second rotary valve that are each mounted on and rotatable with said crankshaft.

15. The UAV propulsion system of claim 14, wherein said first rotary valve and second rotary valve are spaced along a length of said crankshaft.

16. The UAV propulsion system of claim 14, wherein said first rotary valve is dedicated to said first airflow path and said second rotary valve is dedicated to said second airflow path, and wherein said first rotary valve controls an airflow along said first airflow path and to said first crankcase compartment, and said second rotary valve controls an airflow along said second airflow path and to said second crankcase compartment.

17. The UAV propulsion system of claim 1, further comprising:
   a first intake housing that comprises said first airflow path; and
   a second intake housing that comprises said second airflow path.

18. The UAV propulsion system of claim 17, wherein a rotational axis of said crankshaft defines a length dimension of said UAV propulsion system, and wherein said first intake housing and said second intake housing are spaced from one another in said length dimension.

19. The UAV propulsion system of claim 18, wherein said first intake housing is disposed on a first side of said first cylinder assembly in said length dimension, and wherein said second intake housing is disposed on an opposite, second side of said first cylinder assembly in said length dimension.

20. The UAV propulsion system of claim 17, wherein an open end of said first intake housing projects in a direction that a head of said second cylinder assembly is spaced from said crankshaft, and wherein an open end of said second intake housing projects in a direction that a head of said first cylinder assembly is spaced from said crankshaft.

21. The UAV propulsion system of claim 1, wherein said first cylinder assembly and said second cylinder assembly are spaced along said crankshaft, and wherein said first and second pistons move along parallel paths.

22. The UAV propulsion system of claim 1, further comprising a propulsion unit control system that comprises at least one processor, wherein said propulsion unit control system is configured to send control signals to actuator motors in order to adjust engine operation.

23. A UAV comprising an airframe and the UAV propulsion system of claim 1, wherein said UAV propulsion system is integrated to provide a UAV configuration selected from the group consisting of a push-type configuration and pull-type configuration for said UAV.

24. The UAV of claim 23, wherein said airframe further comprises a sensor system, a flight computer that comprises at least one processor and that is operatively connected with said sensor system, at least one adjustable flight control surface, an actuator system operatively interconnected with said flight computer and interconnected with said at least one adjustable flight control surface, and an antenna system.

* * * * *